(12) United States Patent
Katanoda

(10) Patent No.: US 10,500,974 B2
(45) Date of Patent: Dec. 10, 2019

(54) TRAVELABLE DISTANCE CALCULATION SYSTEM AND TRAVELABLE DISTANCE CALCULATION METHOD FOR VEHICLE

(71) Applicant: TOYOTA JIDOSHA KABUSHIKI KAISHA, Toyota-shi, Aichi-ken (JP)

(72) Inventor: Tomoya Katanoda, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 11 days.

(21) Appl. No.: 15/657,528

(22) Filed: Jul. 24, 2017

(65) Prior Publication Data
US 2018/0029500 A1 Feb. 1, 2018

(30) Foreign Application Priority Data
Jul. 26, 2016 (JP) ................. 2016-146656

(51) Int. Cl.
*B60W 20/11* (2016.01)
*B60L 15/20* (2006.01)
(Continued)

(52) U.S. Cl.
CPC .......... *B60L 15/2045* (2013.01); *B60L 58/13* (2019.02); *B60W 20/11* (2016.01); *G01C 21/005* (2013.01); *G01C 21/26* (2013.01); *G01C 21/3469* (2013.01); *G01C 21/3697* (2013.01); *B60L 2240/70* (2013.01); *B60L 2260/52* (2013.01); *B60W 20/00* (2013.01); *Y02T 10/645* (2013.01); *Y02T 10/7005* (2013.01);
(Continued)

(58) Field of Classification Search
CPC .............. B60L 11/1862; B60L 15/2045; B60L 2240/70; B60L 2260/52; B60W 20/00; B60W 20/11; G01C 21/005; G01C 21/26; G01C 21/3469; G01C 21/3697
See application file for complete search history.

(56) References Cited

U.S. PATENT DOCUMENTS

| | | | |
|---|---|---|---|
| 2010/0148952 A1* | 6/2010 | Barajas | B60R 25/00 340/450.2 |
| 2012/0109413 A1* | 5/2012 | Smith | B60L 11/1877 701/1 |

(Continued)

FOREIGN PATENT DOCUMENTS

| | | |
|---|---|---|
| JP | 2011-005900 A | 1/2011 |
| JP | 2013-70515 | 4/2013 |

(Continued)

*Primary Examiner* — Thomas G Black
*Assistant Examiner* — Ce Li Li
(74) *Attorney, Agent, or Firm* — Finnegan, Henderson, Farabow, Garrett & Dunner, LLP

(57) ABSTRACT

A travelable distance calculation system for a vehicle includes a travel history database that stores first data, which includes an electricity consumption history of a target vehicle, and second data, which includes an electricity consumption history of a plurality of vehicles other than the target vehicle; and an arithmetic unit configured to calculates the travelable distance of the target vehicle using at least one of the first data and the second data. The arithmetic unit is configured to set a usage ratio between the first data and the second data according to an operation of a user of the target vehicle when calculating the travelable distance of the target vehicle.

8 Claims, 14 Drawing Sheets

(51) Int. Cl.
  *G01C 21/00*    (2006.01)
  *G01C 21/26*    (2006.01)
  *G01C 21/34*    (2006.01)
  *G01C 21/36*    (2006.01)
  *B60L 58/13*    (2019.01)
  *B60W 20/00*    (2016.01)
(52) U.S. Cl.
  CPC .......... *Y02T 10/705* (2013.01); *Y02T 10/7044* (2013.01); *Y02T 10/72* (2013.01); *Y02T 10/7283* (2013.01); *Y02T 10/7291* (2013.01); *Y02T 90/16* (2013.01); *Y02T 90/161* (2013.01)

(56) References Cited

U.S. PATENT DOCUMENTS

| | | | |
|---|---|---|---|
| 2013/0079962 A1 | 3/2013 | Ishikawa et al. | |
| 2015/0276420 A1* | 10/2015 | McGee | G01C 21/3469 701/118 |
| 2017/0214773 A1* | 7/2017 | Fan | H03M 7/3059 |

FOREIGN PATENT DOCUMENTS

| | | |
|---|---|---|
| KR | 10-2014-0130939 A | 1/2015 |
| WO | WO 2013/108246 A2 | 7/2013 |

* cited by examiner

FIG. 8

| SET TRAVELING CONDITION | |
|---|---|
| TRAVELING PERIOD | JANUARY 1ST TO JANUARY 7TH |
| OUTSIDE AIR TEMPERATURE | 0°C~5°C |
| ACCELERATOR WORK | SIMILAR ACCELERATOR WORK ONLY |
| USAGE AMOUNT OF AIR CONDITIONER | HEATING SLIGHTLY STRONG |
| NUMBER OF OCCUPANTS | THREE |

FIG. 10
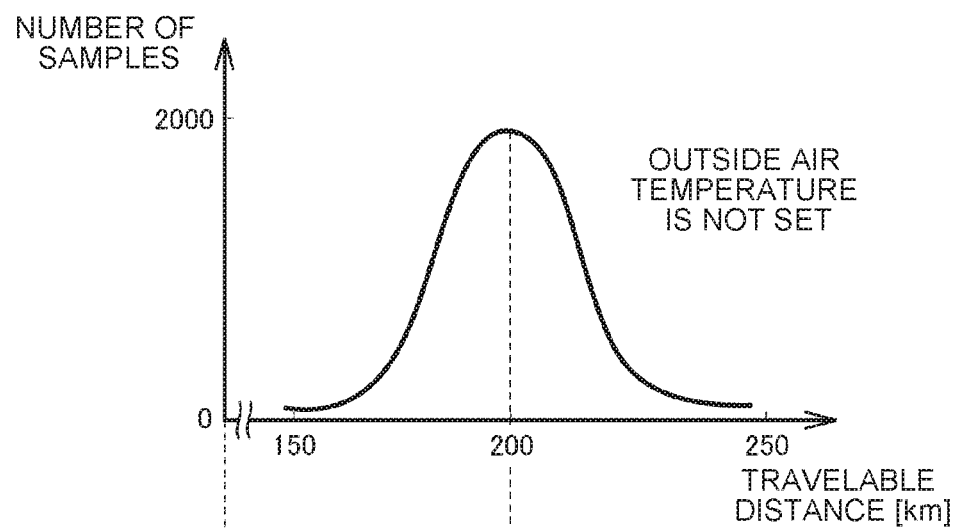
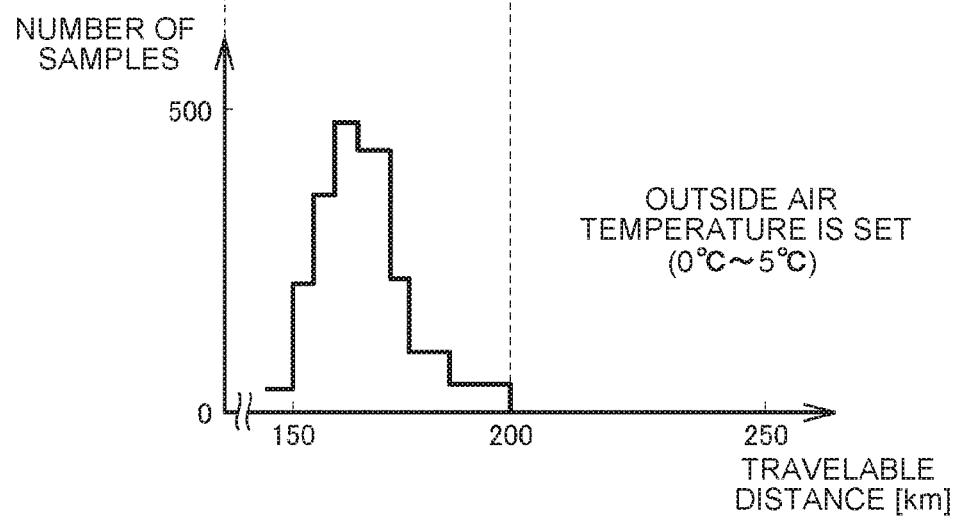

FIG. 11
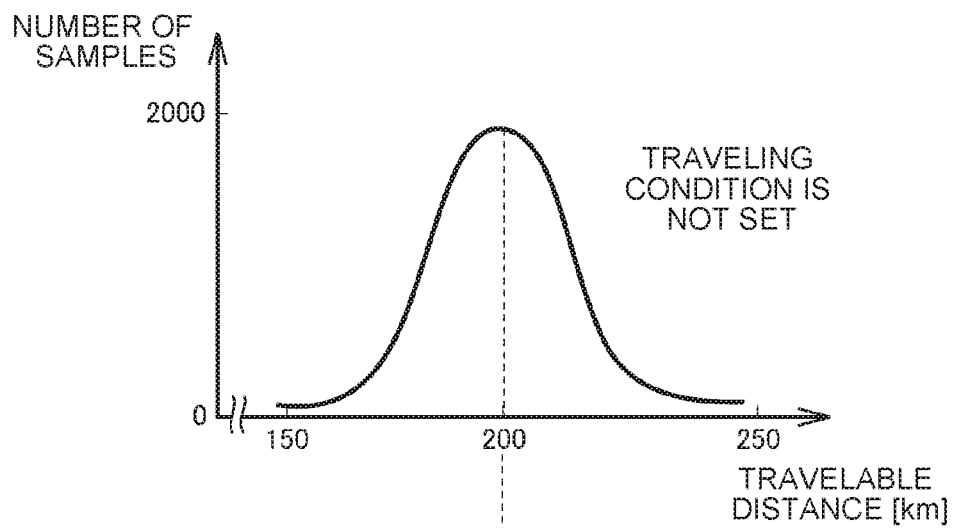
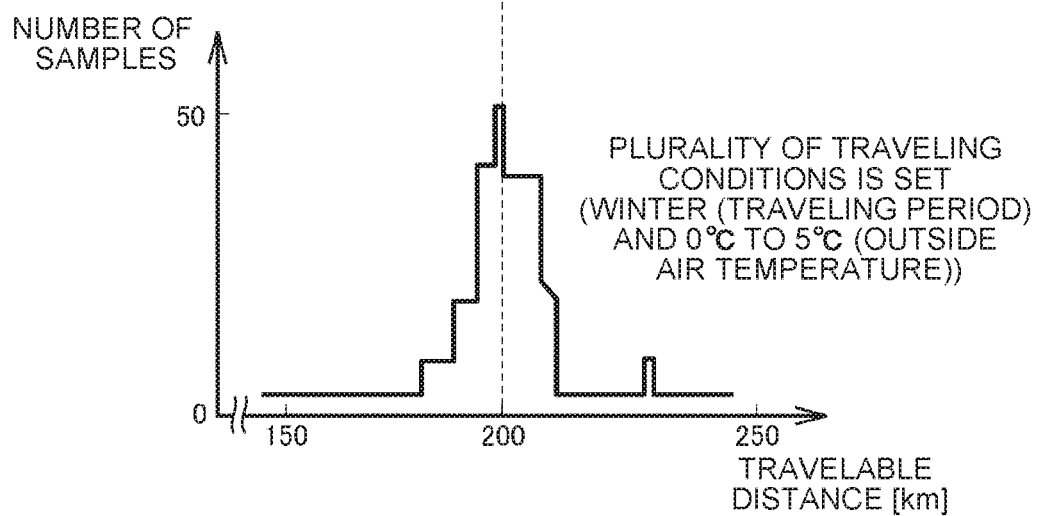

TRAVELABLE DISTANCE CALCULATION SYSTEM AND TRAVELABLE DISTANCE CALCULATION METHOD FOR VEHICLE

INCORPORATION BY REFERENCE

The disclosure of Japanese Patent Application No. 2016-146656 filed on Jul. 26, 2016 including the specification, drawings and abstract is incorporated herein by reference in its entirety.

BACKGROUND

1. Technical Field

The present disclosure relates to a system and a method for calculating the travelable distance of a vehicle.

2. Description of Related Art

In the present disclosure, the term "travelable distance" means the distance that a vehicle can travel while the electric power, stored in the electric storage device, or the fuel stored in the fuel tank (liquid fuel such as gasoline, light oil, and bioethanol, or gaseous fuel such as hydrogen) is consumed up to a predetermined amount. The travelable distance includes the maximum distance that a vehicle can travel when the electric power or the fuel is the maximum amount, but is not limited thereto. The travelable distance includes a distance that a vehicle can travel while the electric power or the fuel at an arbitrary point in time is consumed up to the predetermined amount.

When calculating the travelable distance of a certain vehicle, it is conceivable to use the travel history data actually traveled by other vehicles in the past. For example, the charge control system for an electric vehicle disclosed in Japanese Patent Application Publication No. 2013-070515 (JP 2013-070515 A) includes a travel history database. In this travel history database, travel history data including information on the vehicle type for a plurality of electric vehicles, travel routes, and the electric power consumption amounts on the travel routes is accumulated. When the electric vehicle of the user is charged, the travel history database is searched for the scheduled travel route, and the electric power consumption amount consumed when other electric vehicles traveled on the same travel route in the past is acquired. Then, based on the acquired electric power consumption amount, the amount of electric power necessary for traveling on the travel route is charged.

SUMMARY

The importance of accurately calculating the travelable distance of a vehicle is increasing. For a vehicle that does not have a motor and consumes fuel such as gasoline, there is always a demand for accurately knowing the distance travelable without refueling. This demand may be further increased when the technology of autonomous driving, developed in recent years, has become widespread. In addition, when traveling by an electric vehicle, a situation may occur more frequently in which the user must be conscious of whether the travelable distance (so-called EV travel distance) is sufficient for the distance from the present position to a charging facility such as a charging station.

The inventor of the present disclosure has found that, in the method of using the travel history data on a plurality of other vehicles (other vehicles) when calculating the travelable distance of a certain vehicle (target vehicle), there is room for improvement in the calculation accuracy of the travelable distance of the target vehicle from the viewpoint described below. For example, there are users who have different driving tendencies (habits of driving) different from general users. In addition, the driving skills to drive at low fuel consumption cost or low electric power cost vary from user to user. Therefore, if the travel history data of other vehicles is used uniformly, there is a case where the travelable distance of the target vehicle cannot be accurately calculated.

On the other hand, from the viewpoint of reflecting the driving tendency of the user of the target vehicle in the travelable distance of the target vehicle, it is conceivable to use the past travel history data on the target vehicle. However, for a route where the target vehicle has not traveled much in the past, the travel history data on the target vehicle is not sufficiently accumulated, sometimes with a possibility that there is a large variation in the travel history data. Therefore, even if the travel history data on the target vehicle is used, the travelable distance of the target vehicle may not be accurately calculated in some cases.

The present disclosure is a technique capable of improving calculation accuracy of a travelable distance in a travelable distance calculation system for a vehicle.

A travelable distance calculation system for a vehicle according to one aspect of the present disclosure includes a first storage device that stores an energy consumption history that includes one of a fuel consumption history and an electricity consumption history of a target vehicle as first data; a second storage device that stores the energy consumption history of a plurality of vehicles other than the target vehicle as second data; and an arithmetic unit that calculates a travelable distance of the target vehicle by using at least one of the first and second data. The arithmetic unit is configured to set a usage ratio between the first data and the second data according to an operation of a user of the target vehicle when calculating the travelable distance of the target vehicle.

A travelable distance calculation method for a vehicle, the vehicle including an arithmetic unit, according to another aspect of the present disclosure includes calculating, by the arithmetic unit, a travelable distance of a target vehicle using at least one of first data and second data, the first data including an energy consumption history of a target vehicle, the energy consumption history including one of a fuel consumption history and an electricity consumption history, the second data including the energy consumption history of a plurality of vehicles other than the target vehicle. The calculation described above includes setting, by the arithmetic unit, a usage ratio between the first data and the second data according to an operation of a user of the target vehicle when calculating the travelable distance of the target vehicle.

According to the above configuration or method, the usage ratio between the first data and the second data can be set according to the operation of the user of the target vehicle when calculating the travelable distance of the target vehicle. That is, the user himself/herself can determine the weighting of the first and second data that will be reflected on the travelable distance of the target vehicle. For example, when traveling on a route with a large number of past travels, the usage ratio of the first data may be set relatively high to more appropriately reflect the driving tendency of the user. Conversely, when traveling on a route with a small number of past travels, the usage ratio of the first data may be set relatively low and the second data may be mainly used in order to reduce the influence of the variation in the first data.

The user memorizes the past travel history of the routes such as the route on which the user is going to travel from now. Therefore, the user himself/herself can determine the weighting of the first and second data as described above in consideration of the past experience to reflect more appropriate data on the travelable distance of the target vehicle. As a result, the calculation accuracy of the travelable distance of the target vehicle can be improved.

Preferably, the plurality of vehicles may include vehicles of the same type as that of the target vehicle. The arithmetic unit may be configured to set the usage ratio using data on the vehicles of the same type, the date on the vehicle of the same type may be included in the second data.

According to the above configuration, since the energy consumption (travel distance per unit energy amount) history of the plurality of vehicles becomes almost the same as the energy consumption history of the target vehicle and the similarity becomes high, the calculation accuracy of the travelable distance of the target vehicle can be improved.

Preferably, the second storage device may store the second data for each traveling condition of the plurality of vehicles. The travelable distance calculation system may further include a display device configured to display an image that allows the user to select a traveling condition. When the second data is used, the arithmetic unit may be configured to calculate the travelable distance of the target vehicle using second data corresponding to a traveling condition selected by the user.

The traveling condition is, for example, a condition for a traveling period, traveling area, and outside air temperature. According to the above configuration, since the second data corresponding to a traveling condition selected by the user is used, that is, the user can narrow down the second data in consideration of a traveling condition, the calculation accuracy of the travelable distance of the target vehicle can be further improved.

Preferably, the display device may be configured to display at least one of a distribution of the second data corresponding to the traveling condition selected by the user and a distribution of travelable distances of the plurality of vehicles calculated using the second data corresponding to the traveling condition selected by the user.

When the user narrows down the second data in consideration of the traveling condition, the second data (or the travelable distance of a plurality of vehicles calculated using the second data) may simply be displayed. On the other hand, according to the above configuration, displaying the distribution of the second data allows the user to confirm the validity of the second data (the number of samples or the variation) and then narrow down the second data. Therefore, more appropriate second data can be reflected on the travelable distance of the target vehicle.

Preferably, when specific data is selected by the user from the at least one of distribution displayed on the display device, the display device may be configured to display a traveling condition of the vehicle corresponding to the specific data.

For example, it is possible that the user selects data with the longest travelable distance (that is, theoretically best data with the most efficient energy consumption) from the distribution displayed on the display device and, then, drives the vehicle so that the travelable distance becomes as close as possible to the travelable distance of the data. In such a case, according to the above configuration, the traveling condition (the accelerator work, the electric power consumption amount of the air conditioner, etc.) of the vehicle (vehicle that has achieved the theoretically best data) corresponding to the specific data is displayed on the display device to enable the user to know, under what traveling condition, the travelable distance was obtained. In addition, the user can know what kind of operation (accelerator work, setting of air conditioner, etc.) is to be performed to achieve the longest travelable distance.

Preferably, the display device may be configured to display the at least one of distributions such that the at least one of distributions when a deviation between an actual energy consumption history of the target vehicle and an energy consumption history calculated according to a setting by the user exceeds a predetermined level is larger than the at least one of distributions when the deviation between an actual energy consumption history of the target vehicle and an energy consumption history calculated according to a setting by the user is less than the predetermined level.

According to the above configuration, the selection range given to the user is expanded, for example, when the user selects an arbitrary portion of the distribution of the second data (or the distribution of the travelable distances) on the display screen and, therefore, the user can easily select the second data that matches user's driving tendency.

Preferably, the travelable distance calculation system for a vehicle further may include a display device configured to display a bar for allowing the user to adjust the usage ratio.

According to the above configuration, the bar is used as a user interface to allow the user to intuitively adjust the usage ratio. The usage ratio can be selected, for example, between the minimum value (for example 0%) and the maximum value (for example 100%).

Preferably, the second storage device may be provided in a data center that is outside the target vehicle and outside the plurality of vehicles. The target vehicle may include the first storage device and sends the first data to the data center. The data center may include a server that sets the usage ratio.

It is also possible to directly send the second data from the plurality of vehicles to the target vehicle not via the data center to allow the target vehicle to store (accumulate) the second data, to calculate the energy consumption, and to calculate the travelable distance. However, in practice, this configuration is not realistic because the amount of communication data in the entire system becomes too large. On the other hand, according to the configuration described above, the first and second data is collected in the data center, and the energy consumption is calculated in the data center. As a result, the amount of communication data in the entire system can be reduced.

Preferably, the target vehicle may be configured to send the first data to the data center periodically or when a predetermined condition is satisfied.

In some cases, because the vehicle travels in places where wireless communication is difficult (such as in a tunnel, etc.), the first data cannot always be sent from the vehicle. According to the above configuration, the first data is sent periodically or when a predetermined condition is satisfied (for example, when the vehicle is charged), meaning that data can be sent more reliably.

According to the present disclosure, the travelable distance calculation system for a vehicle can improve the calculation accuracy of the travelable distance.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 8 is a diagram showing an example of a traveling condition setting screen;

FIG. 10 is a diagram conceptually showing the narrowing down of second data by an outside air temperature;

FIG. 11 is a diagram conceptually showing the narrowing down of second data by a plurality of traveling conditions;

DETAILED DESCRIPTION OF EMBODIMENTS

Figure 1:
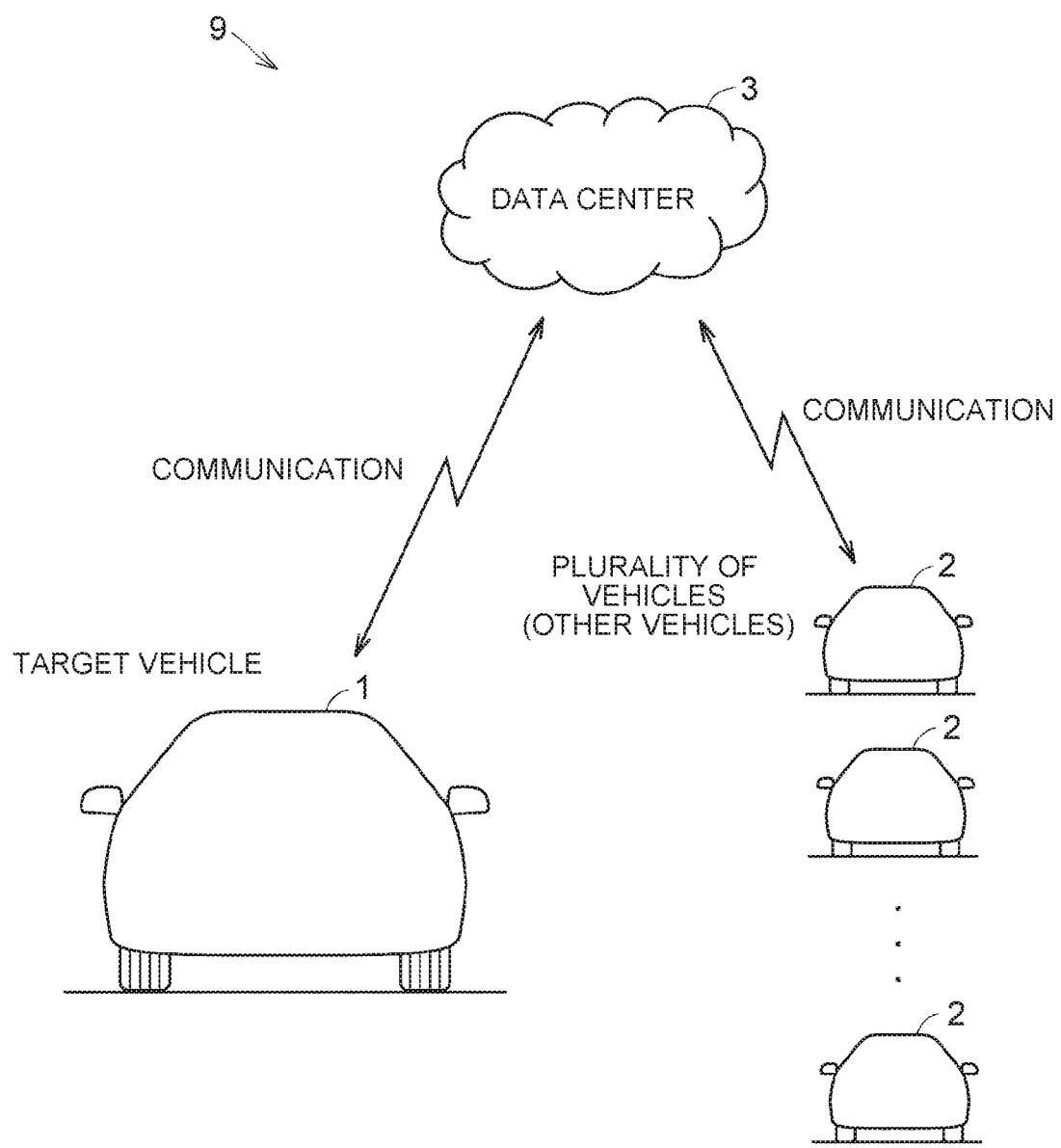
FIG. 1 is a diagram generally showing the overall configuration of a travelable distance calculation system for a vehicle according to a first embodiment.

Embodiments of the present disclosure will be described in detail below with reference to the drawings. In the drawings, the same reference numeral is attached to the same or corresponding part, and the description thereof will not be repeated.

In the following embodiments, a configuration for calculating the travelable distance of an electric vehicle (EV travel distance) will be described as an example. However, the "target vehicle" and the "plurality of vehicles" according to the present disclosure are not limited to an electric vehicle, but may be a vehicle not equipped with a motor for traveling and an electric storage device (such as a gasoline vehicle or a diesel vehicle), a hybrid vehicle, or a fuel cell vehicle. When the "target vehicle" and the "plurality of vehicles" are electric vehicles, the electricity consumption history is used as the "energy consumption history" according to the present disclosure. On the other hand, when the "target vehicle" and the "plurality of vehicles" are gasoline vehicles or hybrid vehicles, the fuel consumption history is used as the "energy consumption history".

FIG. 1 is a diagram generally showing the overall configuration of a travelable distance calculation system for a vehicle according to a first embodiment. A travelable distance calculation system 9 includes a vehicle 1 (target vehicle) of a user (not shown), a plurality of vehicles 2 (hereinafter also referred to as "other vehicles") that are not the user's vehicle and are vehicles other than the vehicle 1, and a data center 3. The vehicle 1 and the data center 3 are configured to be able to communicate with each other. The plurality of vehicles 2 and the data center 3 are also configured to be able to communicate with each other. Although not shown, the vehicle 1 and the plurality of vehicles 2 may also be configured to be able to communicate with each other.

In this embodiment, the vehicle 1 and each of the plurality of vehicles 2 are an electric vehicle. Each of the plurality of vehicles 2 is preferably an electric vehicle having substantially the same electricity consumption (travel distance per unit electric power consumption amount) as the vehicle 1, and more preferably, an electric vehicle of the same vehicle type as the vehicle 1. An electric vehicle having substantially the same electricity consumption as the vehicle 1 may be an electric vehicle having the same vehicle weight classification, such as a small car, a middle-sized car, or a large car, or may be an electric vehicle having the same type of vehicle such as a sedan, a station wagon, or a van. Meanwhile, an electric vehicle of the same vehicle type as the vehicle 1 means an electric vehicle of the same model (vehicle name) in a narrower definition and, more preferably, an electric vehicle of the model and the same year. The data center 3 collects travel history data (first data) D1, which includes the electricity consumption history during the travel of the vehicle 1, and travel history data (second data) D2 which includes the electricity consumption history during the travel of the plurality of vehicles 2. The data center 3 calculates the travelable distance of the vehicle 1 by using at least one of the data D1 and D2. This calculation method will be described later in detail.

Figure 2:
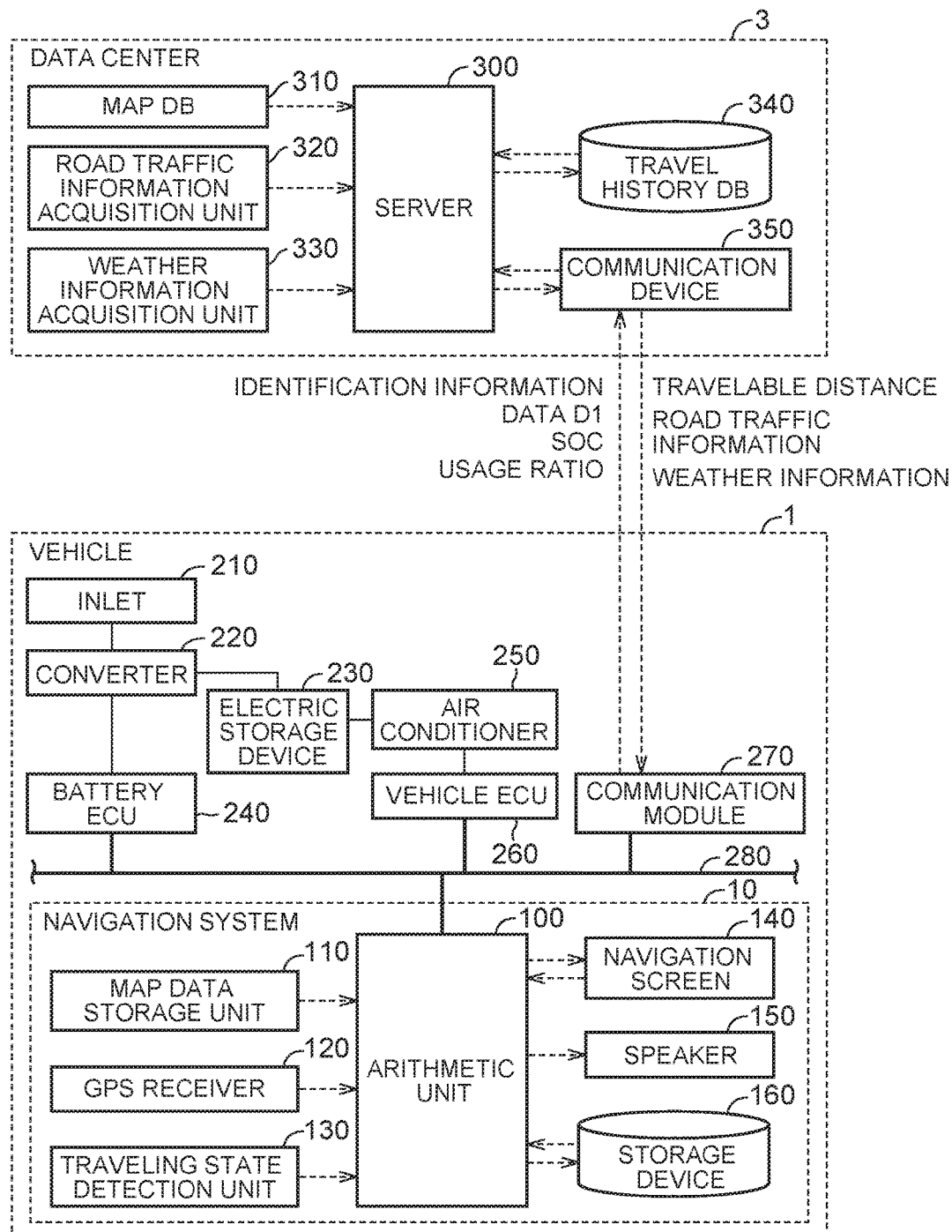
FIG. 2 is a diagram showing the configuration of a vehicle (target vehicle) and a data center shown in FIG. 1 in more detail.

FIG. 2 is a diagram showing the configuration of the vehicle 1 and the data center 3, shown in FIG. 1, in more detail. Although not shown, each of the plurality of vehicles 2 has basically a configuration common to that of the vehicle 1.

The vehicle 1 includes a navigation system 10, an inlet 210, a converter 220, an electric storage device 230, a battery Electronic Control Unit (ECU) 240, an air conditioner 250, a vehicle ECU 260, and a communication module 270. The navigation system 10, the battery ECU 240, the vehicle ECU 260, and the communication module 270 are connected to each other by an in-vehicle Local Area Network (LAN) 280.

The inlet 210 is configured in such a way that the plug (not shown) of the charging cable can be connected from the power supply external to the vehicle 1 (for example, the system power supply not shown) during the charging of the electric storage device 230. The converter 220 converts the voltage of the electric power, supplied from the power source external to the vehicle 1 via the inlet 210, into the voltage chargeable to the electric storage device 230. The electric storage device 230 is a rechargeable DC power supply. The electric storage device 230 is configured to include a secondary battery such as a lithium ion battery or a nickel hydrogen battery, or a capacitor such as an electric double layer capacitor (none of which are shown).

The battery ECU 240 monitors the voltage, current, and temperature of the electric storage device 230 and, at the same time, controls charging and discharging of the electric storage device 230. In addition, the battery ECU 240 calculates the charge state (SOC: State Of Charge) of the electric storage device 230 based on the monitoring result of the electric storage device 230.

The air conditioner 250 performs air conditioning (heating or cooling) in the passenger compartment of the vehicle 1 using the electric power supplied from the electric storage device 230. The electric power consumption of the air conditioner 250 is calculated by the vehicle ECU 260 by monitoring the current, supplied to the air conditioner 250, using, a current sensor or the like not shown. The vehicle ECU 260 controls the air conditioner 250 and, at the same time, controls the devices (for example, the driving device of the motor not shown) so that the vehicle 1 is in the desired state.

The vehicle 1 is configured to be able to carry out data communication with the data center 3 via the communication module 270. The vehicle 1 sends the identification information including the vehicle type of the vehicle 1, travel history data on the vehicle 1 (data D1), and the SOC of the electric storage device 230 to the data center 3 and, at the same time, receives the travelable distance of the vehicle 1 (details will be described later) from the data center 3. The vehicle 1 can also receive the road traffic information (traffic jam, accident, construction, lane restriction, traffic regulation and other information), as well as the weather information (weather information, temperature etc.), from the data center 3 via the communication module 270.

The navigation system 10 includes an arithmetic unit 100, a map data storage unit 110, a Global Positioning System (GPS) receiver 120, a traveling state detection unit 130, a navigation screen 140, a speaker 150, and a storage device 160.

The map data storage unit 110 stores, for example, road map data and facility data, such as various shops, associated with the road map data. The GPS receiver 120 identifies (locates) the current position of the vehicle 1 based on the radio waves from artificial satellites. The traveling state detection unit 130, configured by a gyroscope, a geomagnetic sensor, and the like (none of which are shown), detects the traveling state of the vehicle 1.

The navigation screen 140, for example, a liquid crystal display with a touch panel, displays various kinds of information and accepts a user's operation. By operating the navigation screen 140, the user can set the destination of the vehicle 1 and select a travel route. The speaker 150 outputs speech. The navigation screen 140 corresponds to the "display device" according to the present disclosure. However, the "display device" according to the present disclosure is not limited to the navigation screen 140 but may be, for example, a head-up display. In addition, a user operation may be accepted by the operation of a mechanical switch provided on a center console, a steering wheel, or the like or by a voice input from the microphone.

The storage device 160, for example, a hard disk device, stores travel history data (data D1) actually traveled by the vehicle 1 in the past. The data D1 includes, for example, the information on the travel route of the vehicle 1 (more specifically, data generated by dividing the travel route into a plurality of sections with intersections or the like as nodes and by defining each portion between each two nodes as a link) and the information on the amount of electric power supplied from the electric storage device 230 in each link (electricity consumption history). The data D1 may include the information indicating the driving state (acceleration/deceleration, braking, etc.) of the vehicle 1 in each link and the information on the electric power consumption amount of the air conditioner 250. The data D1 stored in the storage device 160 is sent to the data center 3 via the communication module 270 either periodically or when a predetermined condition is satisfied. Because the vehicle 1 sometimes travels in places where wireless communication is difficult (for example, in a tunnel), the data D1 cannot always be sent from the vehicle 1. Sending the data D1 either periodically or when predetermined conditions are satisfied (for example, when charging the vehicle 1) allows for more reliable transmission.

The arithmetic unit 100 is configured to include a Central Processing Unit (CPU), a memory (Read Only Memory (ROM) and Random Access Memory (RAM)), and an input/output buffer, though none of which are shown. The arithmetic unit 100 calculates the current position, traveling direction, and speed of the vehicle 1 based on the signals from each sensor included in the GPS receiver 120 and the traveling state detection unit 130.

In addition, the arithmetic unit 100 performs various types of navigation processing of the vehicle 1. More specifically, based on the current position of the vehicle 1 and the road map data from the map data storage unit 110, the arithmetic unit 100 displays the current position of the vehicle 1 on the navigation screen 140 with the current position overlaid on the road map around the vehicle 1. Furthermore, the arithmetic unit 100 implements the route guidance function for guiding the vehicle 1 along the recommended route from the current position of the vehicle 1 to the destination. That is, the arithmetic unit 100 receives the recommended route, calculated by the route search processing by the server 300 (described later) of the data center 3, via the communication module 270. Then, the arithmetic unit 100 causes the navigation screen 140 to display the recommended route and, when the vehicle 1 reaches a predetermined point, causes the speaker 150 to output the guidance voice.

The data center 3 includes a server 300, a map database 310, a road traffic information acquisition unit 320, a weather information acquisition unit 330, a travel history database 340, and a communication device 350.

The map database 310 stores road map data for the route search processing. The road traffic information acquisition unit 320 acquires, for example, the latest road traffic information provided from the road traffic information center. The weather information acquisition unit 330 acquires the latest weather information provided, for example, by the weather bureau. The travel history database 340, for example, a hard disk device, stores travel history data (data D1) sent from the vehicle 1 and travel history data (data D2) sent from the plurality of vehicles 2. Since the data D2 includes the same type of information as that of the data D1, the detailed description will not be repeated. The communication device 350 is configured to be able to carry out data communication with the communication module 270 mounted on the vehicle 1. Note that the travel history database 340 corresponds to both the "first storage device" and the "second storage device" according to the present disclosure.

Like the arithmetic unit 100, the server 300 is configured to include a CPU, a memory, and an input/output buffer (none of which are shown). The server 300 stores the data D1, received from the vehicle 1, in the travel history database 340 by stratifying the data D1 by vehicle type and by traveling condition (described later). Similarly, the server 300 stores the data D2, received from the plurality of vehicles 2, in the travel history database 340 by stratifying the data D2 by vehicle type and by traveling condition. In addition, the server 300 performs the route search processing based on the information on the current position and the destination of the vehicle 1, and sends the obtained recommended route to the vehicle 1 via the communication device 350. Furthermore, as described below, the server 300 calculates the travelable distance of the vehicle 1 using the electricity consumption history included in the data D1 and D2.

When calculating the travelable distance of the vehicle 1, the travel history data (data D2) actually traveled by the other vehicles in the past may be used as disclosed, for example, in Japanese Patent Application Publication No. 2013-070515 (JP 2013-070515 A). However, users have driving tendencies (driving habits) different for each user, and there are users who always try to keep a good electricity consumption while there are users who do not particularly care about the electricity consumption. In addition, the driving skills to drive at low electricity consumption also vary from user to user. For example, when the user of the vehicle 1 has a driving tendency or skill different from that of a general user (users of other vehicles), the travelable distance of the vehicle 1 cannot be accurately calculated in some cases if the data D2 is uniformly used.

On the other hand, from the viewpoint of reflecting the driving tendency of the user of the vehicle 1 on the travelable distance of the vehicle 1, it is conceivable to use only the data D1. However, for a route having a small number of past travels of the vehicle 1, there is a possibility that the data D1 is not sufficiently accumulated and the variation in the data D1 is large. Therefore, even if the data D1 is used, the travelable distance of the vehicle 1 cannot be accurately calculated in some cases.

Therefore, in this embodiment, a configuration is employed in which the "usage ratio" between the data D1 and the data D2 can be set (or changed) by a user operation when calculating the travelable distance of the vehicle 1. The usage ratio is the ratio between the degree of reflecting the electricity consumption history of the vehicle 1 and the degree of reflecting the electricity consumption history of other vehicles, in the travelable distance of the vehicle 1. Then, the electricity consumption is calculated using the data D1 and D2 according to the usage ratio that is set by the user and, based on the electricity consumption calculation result, the travelable distance of the vehicle 1 is calculated.

In other words, in this embodiment, the user of the vehicle 1 can determine himself/herself how much to reflect the past travel history of the vehicle 1 when calculating the travelable distance of the vehicle 1. Since the user remembers how frequently and how the vehicle traveled in the route, on which the vehicle 1 is going to travel, in the past, it is possible to appropriately determine the degree to which the data D1 should be reflected. For example, for a route with a large number of past travels, the usage ratio of the data D1 can be set higher than the usage ratio of the data D2 to appropriately reflect the driving tendency of the user. Alternatively, for a route with a small number of past travels, the usage ratio can be set so that the data D2 is mainly used.

As described above, the user himself/herself can determine the weighting of the data D1 and the data D2 by considering past experiences, with the result that more appropriate data (electricity consumption history) is reflected in the travelable distance of the vehicle 1. As a result, the calculation accuracy of the travelable distance of the vehicle 1 can be improved.

The processing for calculating the travelable distance of the vehicle 1 in the first embodiment (hereinafter also referred to as "travelable distance calculation processing") will be described below in detail.

Figure 3:
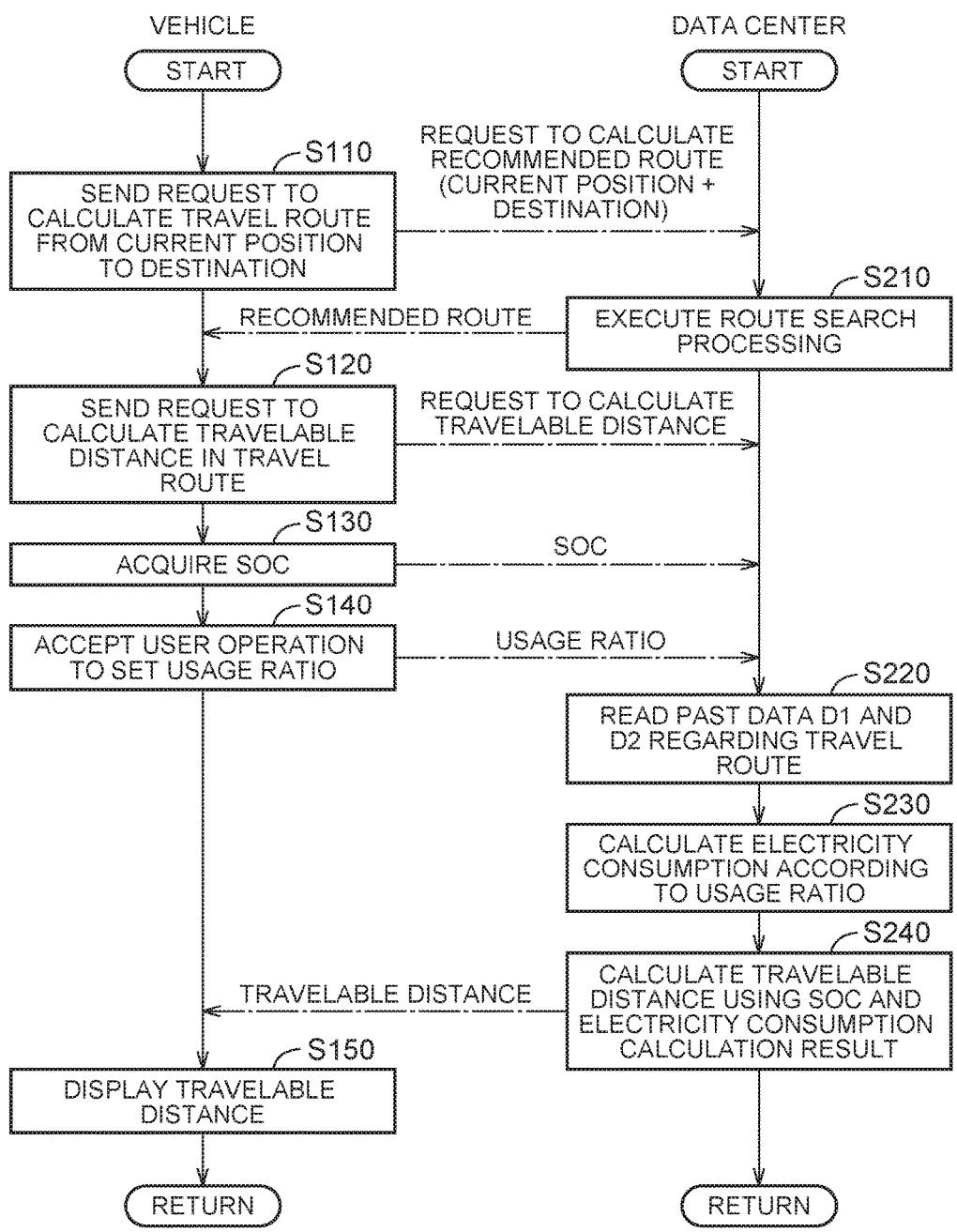
FIG. 3 is a flowchart showing the travelable distance calculation processing according to the first embodiment.

FIG. 3 is a flowchart showing the travelable distance calculation processing according to the first embodiment. In FIG. 3, the case where the destination of the vehicle 1 is set by the user will be described.

The processing shown in FIG. 3 and FIGS. 5 to 7 is called from the main routine (not shown) and executed when predetermined conditions are met (for example, when the user operates the navigation screen 140 to set a destination). The left side of the figure shows a series of processing executed by the arithmetic unit 100 of the vehicle 1, and the right side of the figure shows a series of processing executed by the server 300 of the data center 3. Each step (hereinafter abbreviated as "S") included in these flowcharts is basically implemented by the software processing by the arithmetic unit 100 or the server 300, but some or all of the processing may be implemented by the hardware (electric circuit) included in the arithmetic unit 100 or the server 300.

In S110, the arithmetic unit 100 sends the current position of the vehicle 1 and the information indicating the destination set by the user, as well as a request to calculate a recommended route of the vehicle 1 to the destination (recommended route request), to the server 300. The server 300 executes the route search processing, based on the current position of the vehicle 1, the destination, and the road traffic information, to calculate a recommended route of the vehicle 1 and sends the calculated recommended route to the arithmetic unit 100 (S210). As a result, the travel route of the vehicle 1 in the current travel (trip) is set. Although not shown, a plurality of recommended routes may be sent from the server 300 to the arithmetic unit 100 to allow the user to select one of them. In addition, instead of the server 300 executing the route searching processing, the arithmetic unit 100 executes the route searching processing and sends the calculated travel route from the arithmetic unit 100 to the server 300.

In S120, the arithmetic unit 100 sends to the server 300 a request to calculate the travelable distance of the vehicle 1 (travelable distance request) in the travel route that was set in the processing in S110 and S210. In S130, the arithmetic unit 100 acquires the SOC of the electric storage device 230 from the battery ECU 240 and sends it to the server 300.

In S140, the arithmetic unit 100 controls the navigation screen 140 so that the setting operation of the usage ratio by the user is accepted. The usage ratio that is set by user operation is sent to the server 300.

Figure 4A:
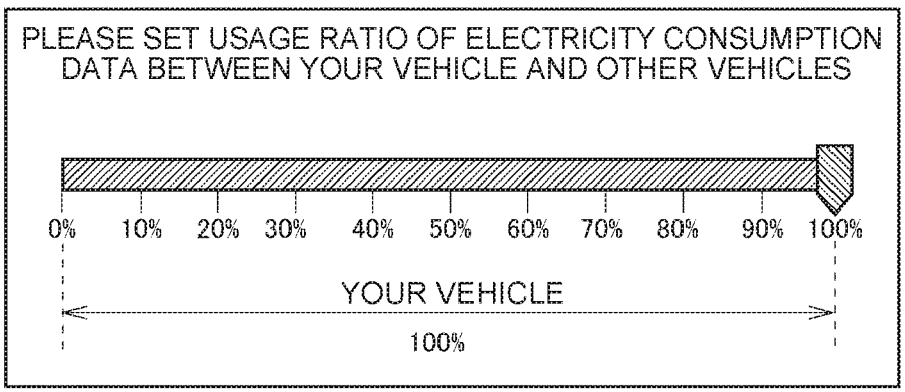
FIGS. 4A and 4B are diagrams showing the setting operation of a usage ratio by a user.
Figure 4B:
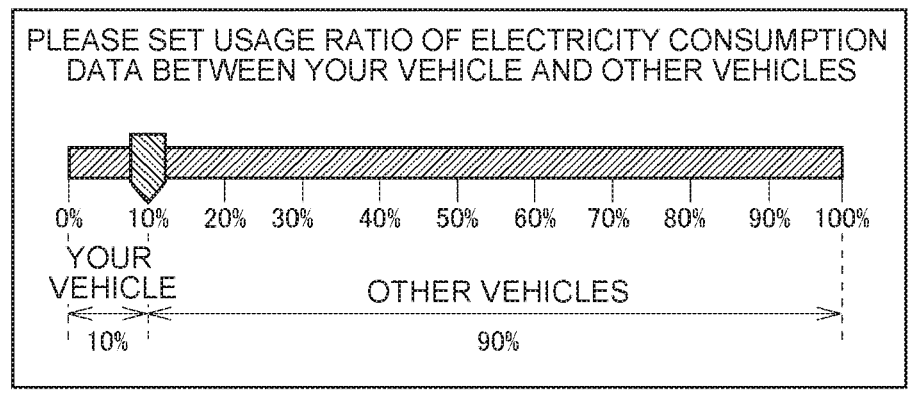

FIGS. 4A and 4B are diagrams showing the setting operation of the usage ratio by the user. FIGS. 4A and 4B show an example of an image displayed on the navigation screen 140 (display with a touch panel). For example, when setting the usage ratio, the message "Please set usage ratio of electricity consumption data between your vehicle and other vehicles", as well as the operation bar for setting the usage ratio of data D1 and data D2, is displayed. By using the operation bar such as the one shown in FIG. 4A and FIG. 4B as an user interface, the user can intuitively adjust the usage ratio. This usage ratio can be selected, for example, between the minimum value (0%) and the maximum value (100%).

For example, when the vehicle 1 travels on a route having a large number of travels by the vehicle 1 (the route with a large number of samples of the data D1) such as a user's commuting route, it is considered that the data D1 should be given more importance than the data D2. Therefore, as shown in FIG. 4A, the user sets the usage ratio (R1:R2) between the data D1 and the data D2, for example, to 100%:0% (R1:R2=100%:0%). This setting allows the travelable distance of the vehicle 1 to be calculated using only the data D1 that reflects the driving tendency (driving habits) of the user.

On the other hand, when the vehicle 1 travels on a route having a relatively small number of travels by the vehicle 1, the variations in the data D1 may be relatively large since the number of samples of the data D1 is small. Therefore, it is considered preferable to place importance on the data D2 rather than the data D1. Therefore, as shown in FIG. 4B, the user sets the usage ratio to, for example, 10%:90% (R1: R2=10%:90%). This setting allows the travelable distance of the vehicle 1 to be calculated by mainly using the data D2 (that is, using the electricity consumption data on average travel), which is based on the past travel history of many other users, while reducing the influence of the variation with respect to the data D1 which is based on the user's own past travel history.

Note that the operation bars shown in FIGS. 4A and 4B are merely examples of the image for the operation to set the usage ratio and that the operation method is not limited thereto. For example, a numeric value input screen may be displayed on the navigation screen 140 to allow the user to input a numerical value indicating the usage ratio. Alternatively, the usage ratio may be accepted by voice input.

Returning to FIG. 3, regarding the travel route of the vehicle 1 (the recommended route calculated in S210), the server 300 reads the past data D1 and D2 from the travel history database 340 in S220.

In S230, the server 300 calculates the electricity consumption required in traveling on the travel route of the vehicle 1 during the current run based on the usage ratio that was set in S140. More specifically, as shown in the following expression (1), the server 300 divides the travel route of the vehicle 1 into a plurality of links Li (i is a natural number). Then, for each link Li, the server 300 calculates the sum of the result, obtained by multiplying the electricity consumption E1 of the vehicle 1 in the link Li by the usage ratio R1 of the data D1, and the result, obtained by multiplying the electricity consumption E2 of the other vehicles in the link Li by the usage ratio R2 of the data D2, as the electricity consumption $Q_i$ for that link.

$$Q_i = E1 \times R1 + E2 \times R2 \quad (1)$$

For example, when the usage ratio is set to R1:R2=10%: 90% as shown in FIG. 4B, assume that the electricity consumption E1 of the vehicle 1 and the electricity consumption E2 of the other vehicles for the kth link $L_k$ (k is a natural number) are 6.0 (km/kWh) and 8.0 (km/kWh) respectively. Then, the electricity consumption $Q_k$ for that link $L_k$ is calculated as $Q_k$=6.0×0.10+8.0×0.90=7.8 (km/kWh). In this manner, the electricity consumption $Q_i$ of all the links $L_i$ included in the travel route of the vehicle 1, is calculated.

As the electricity consumption E2 of the other vehicles, the median value, the average value, or the mode of the data of the plurality of vehicles 2, included in the data D2, may be used. The same is true for the electricity consumption E1 of the vehicle 1.

In S240, the server 300 calculates the travelable distance of the vehicle 1 using the SOC of the electric storage device 230, acquired from the vehicle 1 in S130, and the electricity consumption calculation result calculated in S230. More specifically, for each link $L_i$ included in the travel route of the vehicle 1, the arithmetic unit 100 calculates the electric power consumption amount [unit: kWh] in the link $L_i$ based on the length [unit: km] of the link $L_i$ and the electricity consumption $Q_i$ [unit: km/kWh] in the link $L_i$. Then, the arithmetic unit 100 converts the SOC of the electric storage device 230 into the remaining electric power amount. After that, as the travelable distance of the vehicle 1, the arithmetic unit 100 calculates the integrated value of the lengths of the link $L_i$ along the travel route, from the current position of the vehicle 1 to the point where the remaining electric power amount of the electric storage device 230 reaches the predetermined value (lower limit value). The server 300 sends the calculated travelable distance to the arithmetic unit 100.

In S150, the arithmetic unit 100 displays the travelable distance, received from the server 300, on the navigation screen 140. After that, the processing returns to the main routine. The travelable distance of the vehicle 1 can be serially updated to the latest value by repeatedly executing a series of processing by the steps in FIG. 3 except S110, S210, and S140. This update processing is not explicitly shown in the figure.

The order in which the information and requests are sent from the arithmetic unit 100 to the server 300 in S110 to S140 is not fixed, but the order may be changed as necessary. Alternatively, these pieces of information and requests may be sent at a time.

In the first embodiment, when calculating the travelable distance of the vehicle 1, the user can perform an operation on the navigation screen 140, as described above, to set the weighting between the data D1, which includes the electricity consumption history of the vehicle 1, and the data D2, which includes the electricity consumption history of the plurality of vehicles 2 (other vehicles).

The user memorizes the past travel history of the route on which to travel. For example, the user memorizes the past traveling frequency of the travel route. In addition, the user memorizes what were the conditions during past traveling, such as the occurrence of congestion due to an accident during the traveling of the vehicle 1 or an exceptional weather condition such as heavy rain or snow fall. In addition, the user also knows a plan (hope) as to what the user wants to do this time, for example, whether the user wants to travel with priority on the electricity consumption or whether the user wants to reach the destination in a short time without paying much attention to the electricity consumption. Therefore, based on the memory of the user himself/herself, the user can determine whether the past travel history of the user is similar to the present travel schedule and, according to the determination result, put a weight on the electricity consumption.

When the current travel schedule is similar to the travel history of the past, the user can set the usage ratio R1 (in other words, the weight) of the data D1 relatively higher; on the other hand, when the current travel schedule is not similar much to the past travel history, the user can set the usage ratio R1 of the data D1 relatively lower (that is, the usage ratio R2 of the data D2 relatively higher). In this way, the user can set the usage ratio between the data D1 and D2 by himself/herself to allow the weighting of the electricity consumption history, which is determined based on the user's past travel history and the current travel schedule, to be appropriately determined based on the user's experience. As a result, the calculation accuracy of the travelable distance of the vehicle 1 can be improved.

The processing method in which the data D2 is sent from the plurality of vehicles 2, not via the data center 3, but directly to the vehicle 1 to allow the vehicle 1 to accumulate the data D2, to calculate the electricity consumption, and to calculate the travelable distance is not realistic, because the amount of communication data in the whole travelable distance calculation system 9 becomes too large. On the other hand, according to the first embodiment, the data D1 and D2 are collected and accumulated in the data center 3, the electricity consumption and the travelable distance are calculated in the data center 3, and the calculation result is sent from the data center 3 to the vehicle 1. This processing method makes it possible to reduce the amount of communication data in the whole travelable distance calculation system 9.

In the first embodiment, the configuration, in which the server 300 of the data center 3 calculates the travelable distance, has been described. However, the travelable distance may be calculated also by the arithmetic unit 100 of the vehicle 1.

Figure 5:
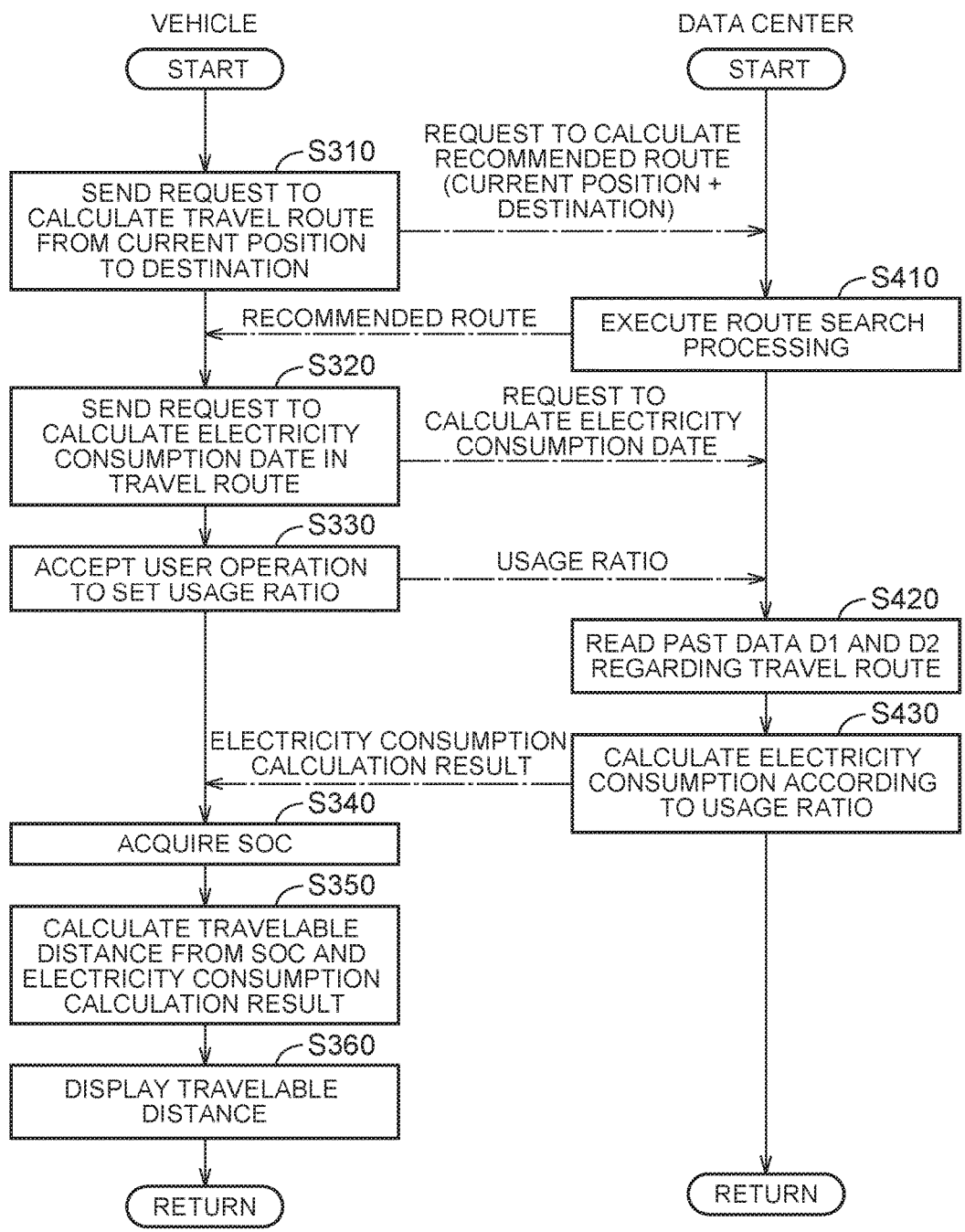
FIG. 5 is a flowchart showing the travelable distance calculation processing according to a first modification of the first embodiment.

FIG. 5 is a flowchart showing the travelable distance calculation processing according to a first modification of the first embodiment. The processing in S310 and S410 is equivalent to the processing in S110 and S210 (see FIG. 3) in the first embodiment.

In S320, the arithmetic unit 100 sends to the server 300 a request to calculate the electricity consumption data (electricity consumption data request) in the travel route of the vehicle 1. In S330, the arithmetic unit 100 controls the navigation screen 140 so that a user operation for setting the usage ratio may be accepted.

In S420, the server 300 reads the past data D1 and D2 for the travel route of the vehicle 1 from the travel history database 340. In S430, the server 300 calculates the electricity consumption data on the travel route of the vehicle 1 based on the usage ratio that was set in S330. The processing described above is equivalent to the processing in S220 and S230 in the first embodiment. The server 300 sends the calculated electricity consumption data (electricity consumption calculation result) to the arithmetic unit 100.

In S340, the arithmetic unit 100 acquires the SOC of the electric storage device 230 from the battery ECU 240. In S350, the arithmetic unit 100 calculates the travelable distance of the vehicle 1 based on the SOC of the electric storage device 230 and the electricity consumption calculation result sent from the server 300 in S430. This process is equivalent to the process of S240 in the first embodiment. In addition, the arithmetic unit 100 displays the calculated travelable distance on the navigation screen 140 (S360).

According to the first modification of the first embodiment, the user performs an operation on the navigation screen 140 as described above to set the usage ratio between the data D1 and the data D2 as in the first embodiment. This allows the calculation accuracy of the travelable distance of the vehicle 1 to be improved also in a configuration in which the travelable distance is calculated by the arithmetic unit 100.

[Second modification of first embodiment] In the first embodiment (and first modification thereof), the processing has been described in which the travelable distance of the vehicle 1 is calculated after setting the travel route of the vehicle 1. However, the setting of the travel route is not indispensable and, as described below, the calculation accuracy of the travelable distance can be improved even when the travel route is not set.

Figure 6:
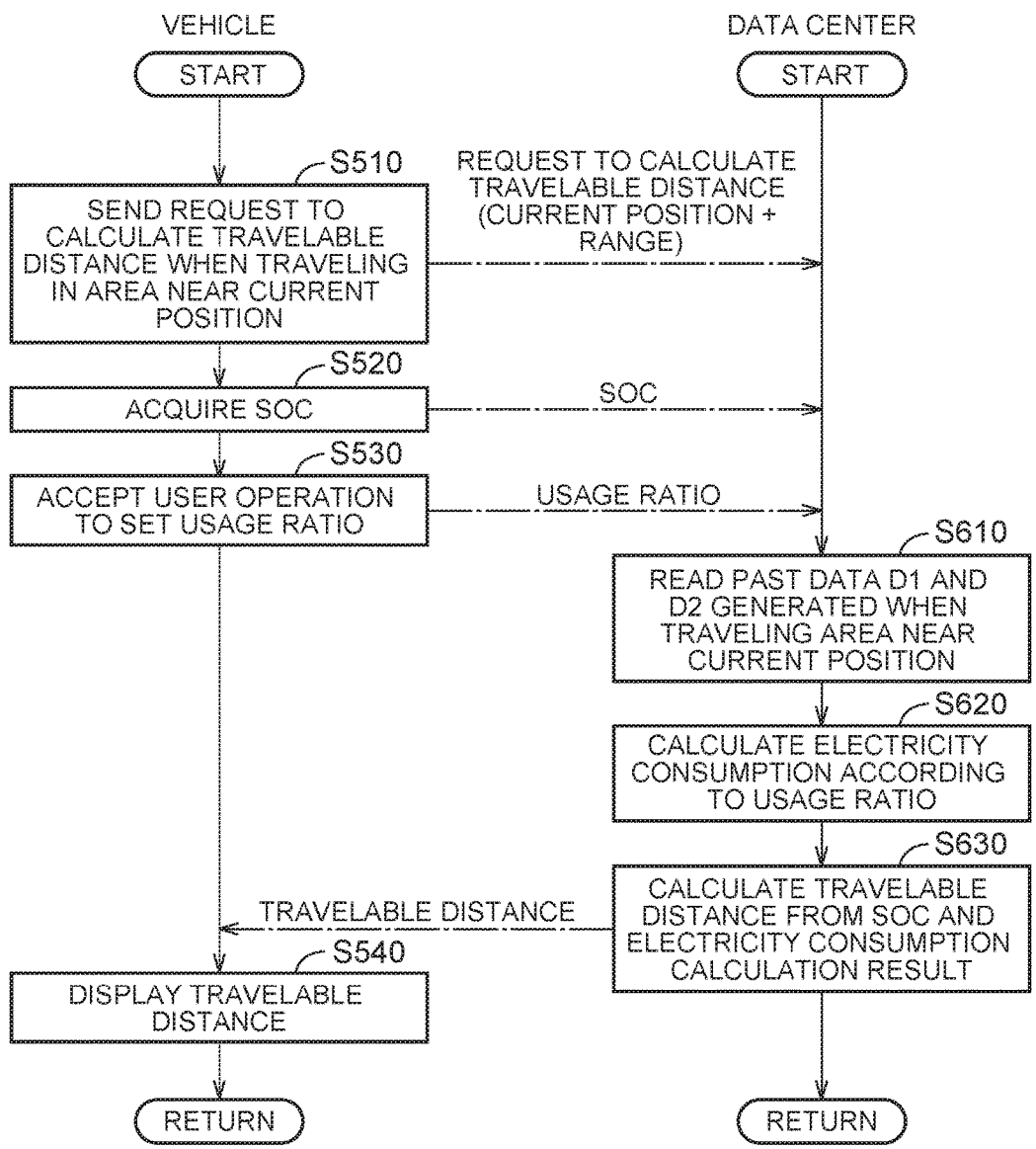
FIG. 6 is a flowchart showing the travelable distance calculation processing according to a second modification of the first embodiment.

FIG. 6 is a flowchart showing the travelable distance calculation processing according to a second modification of the first embodiment. This flowchart is different from the flowchart (see FIG. 3) in the first embodiment in that the processing of S110 and S 210 is not included and that the processing of S510 is included instead of the processing of S120 and S220.

In S510, the arithmetic unit 100 sends to the server 300 the information indicating the current position of the vehicle 1, as well as a request to calculate the travelable distance that the vehicle 1 will be able to travel in the area near the current position of the vehicle 1 (more specifically, the area in a predetermined range (for example, 50 km range) centered on the current position of the vehicle 1). This is because there are areas with many slopes or areas where traffic congestion tends to occur and therefore the data D2, which includes the electricity consumption history of other vehicles, can differ from area to area. The predetermined range described above may be a predetermined fixed value or a variable value that can be changed by a user's operation.

The subsequent processing of S520 and S530 is equivalent to the processing in S130 and S140 respectively in the first embodiment. That is, the arithmetic unit 100 sends the information, which indicates the SOC of the electric storage device 230 and the usage ratio of the travel history data, to the server 300.

In S610, the server 300 reads data D1 and D2 about the area near the current position of the vehicle 1 from the travel history database 340. The subsequent processing in S620, S630, and S540 is equivalent to the processing in S230, S240, and S150 in the first embodiment, respectively, and detailed description thereof will not be repeated.

According to the second modification of the first embodiment, even when the travel route of the vehicle 1 is not set, the calculation accuracy of the travelable distance of the vehicle 1 can be improved by extracting the data D2 on the area, for example, within a predetermined range centered on the current position of the vehicle 1 as described above.

The data D2, read from the travel history database 340 when calculating the travelable distance of the vehicle 1, includes data under various traveling conditions or traveling environments. Depending on what kind of data is to be extracted from such various types of data D2, the calculation result of the travelable distance of the vehicle 1 may be different. Therefore, in order to further improve the calculation accuracy of the travelable distance, it is considered preferable to narrow down the data D2 and use more appropriate data for calculating the travelable distance. To meet such a need, a configuration will be described in the second embodiment that allows the user to perform an operation for narrowing down the data D2 and, at the same time, gives the user a motivation to perform such a user operation.

Figure 7:
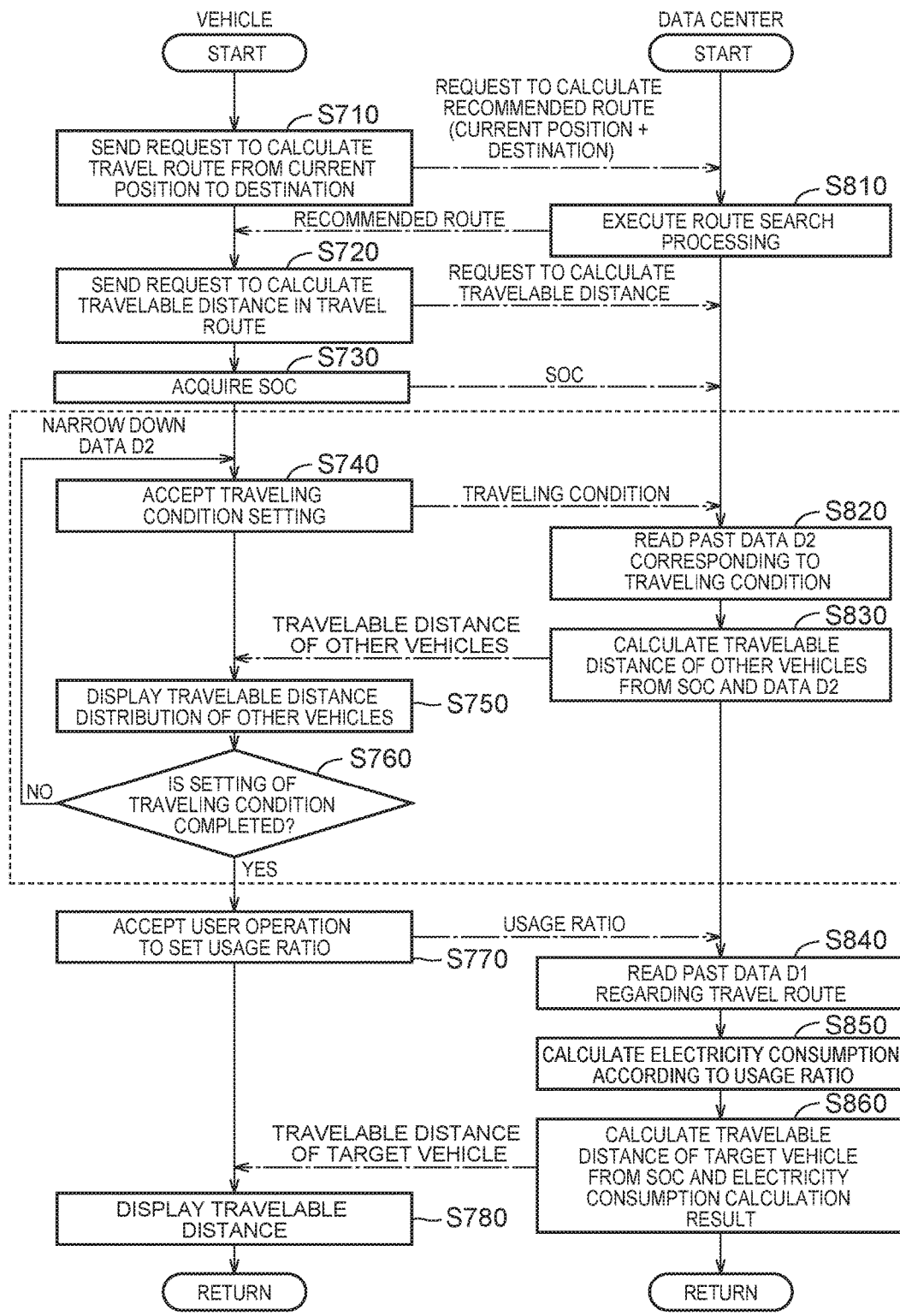
FIG. 7 is a flowchart showing the travelable distance calculation processing according to a second embodiment.

FIG. 7 is a flowchart showing the travelable distance calculation processing in the second embodiment. This flowchart is different from the flowchart in the first embodiment (see FIG. 3) in that the processing in S740, S820, S830, S750, and S760 (indicated by the broken line) is added for narrowing down the data D2 according to the traveling conditions. The processing in S710, S810, S 720, and S730 is equivalent to the processing in S110, S210, S120, and S130 in the first embodiment.

In S740, the arithmetic unit 100 accepts an operation performed by the user to set traveling conditions. This control is implemented by the arithmetic unit 100 that displays a predetermined setting screen, such as the one shown below, on the navigation screen 140.

FIG. 8 is a diagram showing an example of the traveling condition setting screen. For example, as the traveling conditions, the traveling period, the outside air temperature, the accelerator work, the usage amount of the air conditioner 250, and the number of occupants of the vehicle 1 may be set. The traveling period and the outside air temperature of the vehicle 1 will be described later with reference to FIGS. 9 to 11.

The accelerator work is one indicator indicating the driving tendency of the user. For example, the user can set the indicator, which indicates the accelerator work, to one of the following two extraction modes: in one mode, the data D2 on the other vehicles similar to the data D1 of the vehicle 1 is selectively extracted and, in the other mode, the data D2 is extracted irrespective of the similarity/dissimilarity between the data D2 and the data D1. The similarity/dissimilarity of the accelerator work can be determined, for example, by the frequency (the number of times per unit time) at which a specific traveling pattern that the user's driving tendency is likely to occur appears. For example, the vehicle of a user who prefers to overtake other vehicles often shows a traveling pattern in which the vehicle once accelerates from approximately 40 km/h to approximately 60 km/h and, then, travels again at approximately 40 km/h. Therefore, by classifying the driving tendency of the users according to the frequency at which such a traveling pattern appears, the similarity/dissimilarity between the driving tendency of one user and the driving tendency of another user can be determined.

In addition, since the electric power consumption by the air conditioner 250 can have a large influence on the travelable distance of the vehicle 1, it is desirable to take into consideration the degree of the use of the air conditioner 250. Therefore, the user can select between cooling and heating and, at the same time, set the strength of the air volume, for example, in five stages.

Furthermore, the weight of the vehicle 1 can also have an influence on the travelable distance of the vehicle 1. When the vehicle 1 and the vehicle 2 are the same type of vehicle, the user may select, for example, the number of occupants since the weights of the vehicles are considered to be about the same. The number of occupants may be detected by a load sensor provided on the seat, or may be detected by the tire air pressure sensor (none shown). It is also possible to estimate the number of occupants by the number of times the door (not shown) is opened and closed.

One or more of the traveling conditions described above are selected by a user operation and then sent to the server 300. It is preferable that the initial values of the traveling conditions be displayed on the navigation screen 140 by the arithmetic unit 100 according to the detection results of the various sensors (that is, the recommended values are suggested from the arithmetic unit 100 to the user) and that those values be changeable by the user.

Returning to FIG. 7 the server 300 reads the data D2 from the travel history database 340 in S820. This data D2 is related to the travel route, which was set in S710 and S810, and that has been narrowed down according to the user-specified traveling conditions. Furthermore, in S830, the server 300 uses the SOC of the electric storage device 230, sent from the arithmetic unit 100 in S730, and the data D2, read in S820, to calculate the travelable distance distribution of the other vehicles concerning the travel route described above (the distribution will be described later with reference to FIGS. 9 to 11). The travelable distance distribution of the other vehicles is calculated on the assumption that the SOC (electric power amount) of the electric storage device mounted in the other vehicles is equal to the SOC of the electric storage device 230 mounted in the vehicle 1. The calculated travelable distance distribution of the other vehicles is sent to the arithmetic unit 100. The arithmetic unit 100 displays the travelable distance distribution of the other vehicles on the navigation screen 140 (S750).

Figure 9:
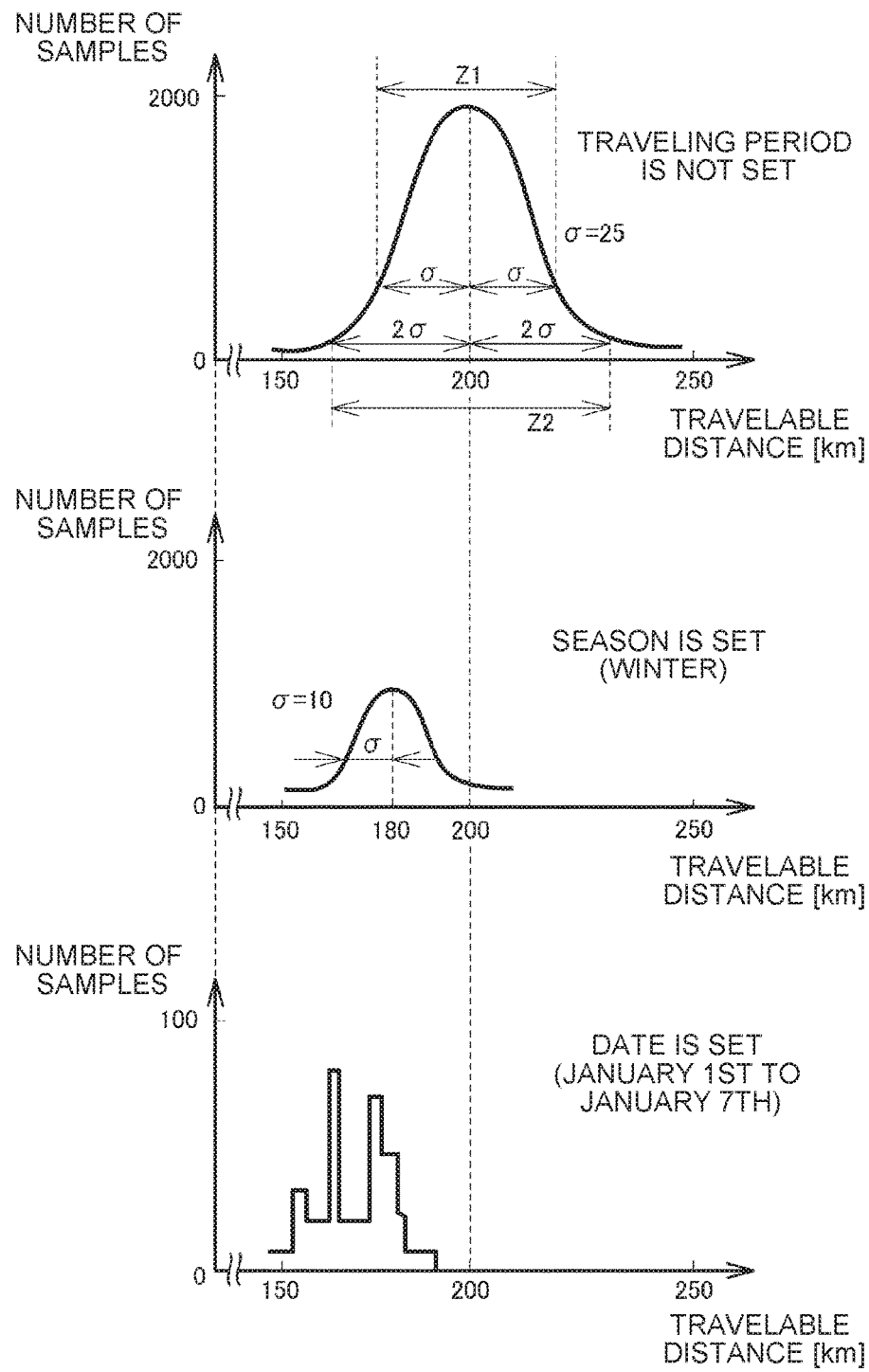
FIG. 9 is a diagram conceptually showing the narrowing down of second data by a traveling period.

FIG. 9 is a diagram conceptually showing the narrowing down of the data D2 by the traveling period. FIG. 10 is a diagram conceptually showing the narrowing down of the data D2 by the outside air temperature. In FIGS. 9 and 10 and in FIGS. 11 and 12 that will be described later, the horizontal axis represents the travelable distance of the other vehicles calculated from the data D2. The vertical axis represents the number of samples (number of data pieces) of the data D2. It should be noted that the numeric values shown in these figures are only illustrative for easy understanding.

First, referring to FIG. 9, the weather conditions and road traffic conditions will be different if the traveling period is different and, therefore, there is a high possibility that the travelable distances of the vehicle will be different. The traveling period may be a season (for example, winter), a month (for example, January), or a period designated by a specific date (for example, January 1st to January 7th). In addition, when setting the traveling period using a season, it is necessary to predefine the period corresponding to each season (for example, winter is defined as a period from December 1st to February 28th).

When the traveling period of the vehicle 1 is not set, all data D2 about the travel route of the vehicle 1 is used as shown in the top of FIG. 9. Since the data D2 in this case includes data, for example, under various weather conditions or road traffic conditions, the variation in the travelable distances of other vehicles also increases. In the example shown in the top of FIG. 9, the standard deviation σ is 25 km. The median value (or the average value or the mode value) of the travelable distance is, for example, 200 km.

As shown in the middle of FIG. 9, the number of samples of the data D2 is smaller when winter is set as the traveling period than when the traveling period is not set. In addition, the travelable distance distribution of other vehicles can also change. The middle of FIG. 9 indicates that the median value of the travelable distance is shifted from 200 km to 180 km. Furthermore, the figure indicates that the variation in the travelable distance is reduced and the standard deviation σ is 10 km.

For example, as shown in the bottom of FIG. 9, the number of samples of the data D2 when the period from January 1st to January 7th is set as the traveling period becomes even smaller than when winter is set. When the traveling period is too short as in this way, the number of samples is sometimes insufficient with the result that the dispersion of the travelable distance distribution of other vehicles becomes large. Therefore, when narrowing down the data D2, it is preferable to display the travelable distance distribution of other vehicles, as shown in the middle of FIG. 9 and in the bottom of FIG. 9, on the navigation screen 140 to allow the user to confirm whether the traveling period the user set is appropriate.

Referring to FIG. 10, the outside air temperature is a temperature range (for example, 0° C. to 5° C.) of the outside air of the vehicle 1. Because the discharge efficiency of the electric storage device 230 differs according to the outside air temperature, the outside air temperature has an influence on the travelable distance. As in the description of FIG. 9, the travelable distance distribution of other vehicles can also be changed by setting outside air temperature.

FIG. 11 is a diagram conceptually showing the narrowing down of the data D2 by a plurality of traveling conditions. The user can set the traveling condition using a combination of any two or more of the traveling period, outside air temperature, accelerator work, usage amount of the air conditioner 250, and number of occupants to narrow down the data D2 (in the example shown in the bottom of FIG. 11, a combination of the traveling period (winter) and the outside air temperature (0° C. to 5° C.) is set).

The user confirms the travelable distance distribution of other vehicles, such as those shown in FIGS. 9 to 11, on the navigation screen 140 to determine whether the data D2, narrowed down by the traveling condition that is set by the user, is to be used for calculating the travelable distance of the vehicle 1. The user can determine whether to use the traveling condition, which has been set, from the viewpoint of whether the number of samples of the data D2 is sufficient, whether the variation is sufficiently small, or whether the travelable distance of other vehicles seems reasonable in light of the user's past experience.

Furthermore, the user may perform an operation on the navigation screen 140 to select an arbitrary part of the travelable distance distribution of other vehicles (touch on the navigation screen 140). By doing so, only the specific data, corresponding to the selected part, may be extracted. For example, the user may select data, corresponding to the median of the travelable distance distributions of other vehicles, in a pinpoint manner.

Alternatively, the user can select data corresponding to the longest travelable distance (that is, the theoretically best data corresponding to the most effective electricity consumption) and drive the vehicle 1 so that the traveling distance is as close as possible to the travelable distance corresponding to the data. When specific data is selected in this manner, the traveling conditions (accelerator work, electric power consumption amount of the air conditioner, etc.) of the vehicle corresponding to the selected data may be displayed on the navigation screen 140. This display allows the user to know under what traveling conditions the travelable distance was obtained. Furthermore, this display allows the user to know what kind of operation (more specifically, the setting of accelerator work and air conditioner) is to be performed in order to achieve the longest travelable distance.

For ease of understanding, the examples are described in FIGS. 9 to 11 in which the travelable distance distribution of other vehicles is displayed on the navigation screen 140 with the travelable distance of other vehicles on the horizontal axis. Instead, when the electricity consumption data is received from the server 300 as in the first modification of the first embodiment (see FIG. 5), the electricity consumption data distribution may be displayed with the electricity consumption on the horizontal axis.

Returning to FIG. 7, the arithmetic unit 100 determines in S760 whether the user has completed the setting of traveling conditions (narrowing down of data D2). More specifically, if the user, who has confirmed the travelable distance distribution of the other vehicles displayed on the navigation screen 140, determines that the traveling condition, which was set in S740, is not appropriate and if the user has performed an operation on the navigation screen 140 to indicate that the traveling condition is not appropriate (for example, the operation to press the "reset" button on the touch panel), the arithmetic unit 100 determines that setting of the traveling condition has not yet been completed (NO in S760) and the processing returns to S740. As a result, the processing of S740, S820, S830, S750, and S760 is repeated until the traveling condition that is determined by the user to be appropriate is set.

On the other hand, if the user has performed an operation to indicate that the traveling condition is determined to be appropriate (for example, the operation to press the "OK" button on the touch panel), the arithmetic unit 100 determines that setting of the traveling condition is completed (YES in S760) and the processing proceeds to S770. In S770, the arithmetic unit 100 operates the navigation screen 140 so that the a user's operation to set the usage ratio is accepted. The usage ratio that is set is sent to the server 300.

In S840, the server 300 reads the past data D1, regarding the travel route (recommended route) calculated in S810, from the travel history database 340. The subsequent processing of S850, S860, and S780 is equivalent to the processing of S230, S240, and S150 in the first embodiment, respectively, and detailed description thereof will not be repeated. When the user performs the setting processing of the traveling condition repeatedly, the data D1, which was read in S840, and the latest data D2, which was last read in S820, are used for calculating the electricity consumption in S850.

When a travel route is not set as in the second modification of the first embodiment, the traveling condition can be narrowed down by the traveling area. If the traveling area differs, the travelable distance may also differ depending not only on the weather conditions but also on the terrain conditions such as whether the area is a steep sloping area (many sloping roads) or a flat area.

Figure 12:
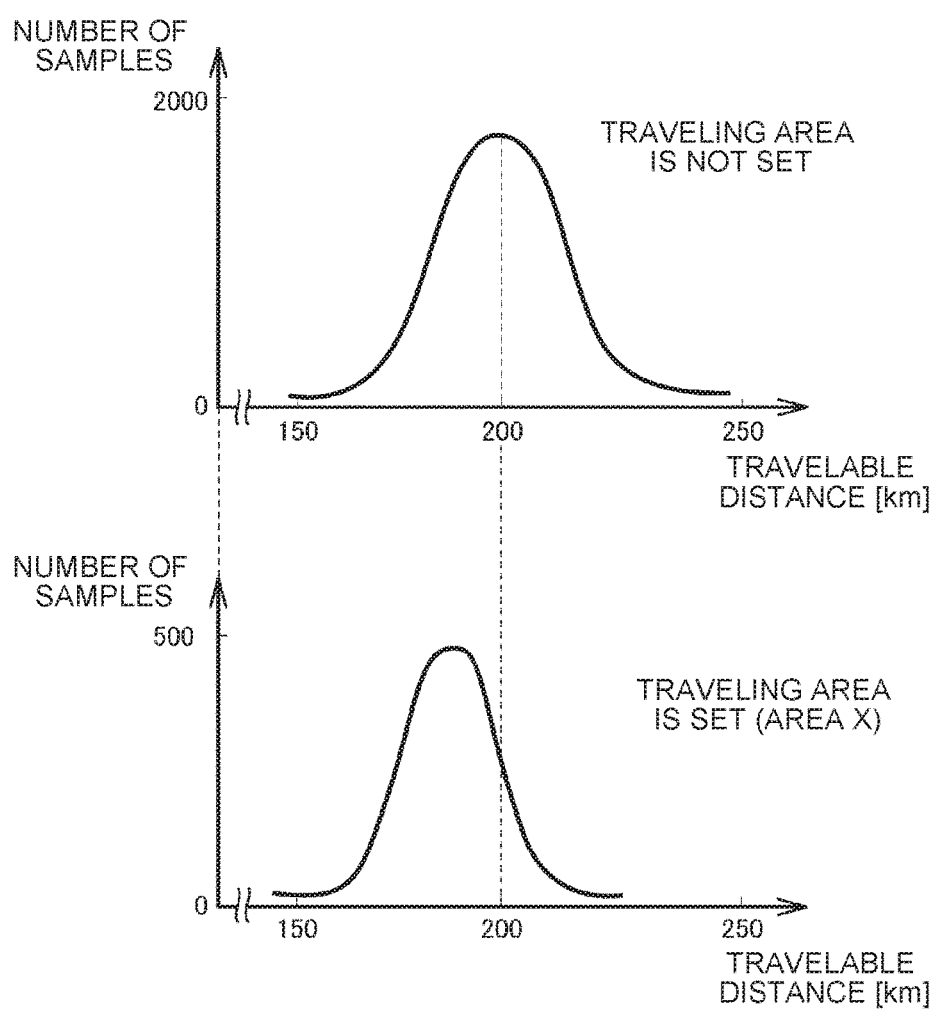
FIG. 12 is a diagram conceptually showing the narrowing down of second data by a traveling area.

FIG. 12 is a diagram conceptually showing the narrowing down of the data D2 by the traveling area. When the data D2 concerning an area within a predetermined range (for example, a range of 50 km), centered on the current position of the vehicle 1, is used for calculating the travelable distance, the weather condition or the terrain condition may vary from location to location within the predetermined range. Therefore, the data D2 may be narrowed down, for example, by an area narrower than the predetermined range (prefecture, state, or city, etc.) or the data D2 may be narrowed down by a still narrower area (town or village). As shown in the bottom of FIG. 12, the travelable distance distribution of the other vehicle can be shifted, and its shape can be changed, when the area X is set as the traveling area as compared to when the traveling area is not set (see the top of FIG. 12).

As described above, according to the second embodiment, the data D2 to be used for calculating the travelable distance of the vehicle 1 is narrowed down according to the traveling condition that is set by the user. This makes it possible to calculate the electricity consumption using only the data D2 concerning a traveling condition similar to the traveling condition of the vehicle 1, further improving the calculation accuracy of the travelable distance of the vehicle 1 as compared to the first embodiment.

Because the driving tendency differs from user to user, there may be users for whom the server 300 often calculates the travelable distance that is shorter, or conversely longer, than the actual travel distance (actual value) of the vehicle 1. Therefore, in the first modification of the second embodiment, the processing will be described in which the server 300 carries out various adjustments according to the driving tendency of the user (the vehicle 1).

Figure 13:
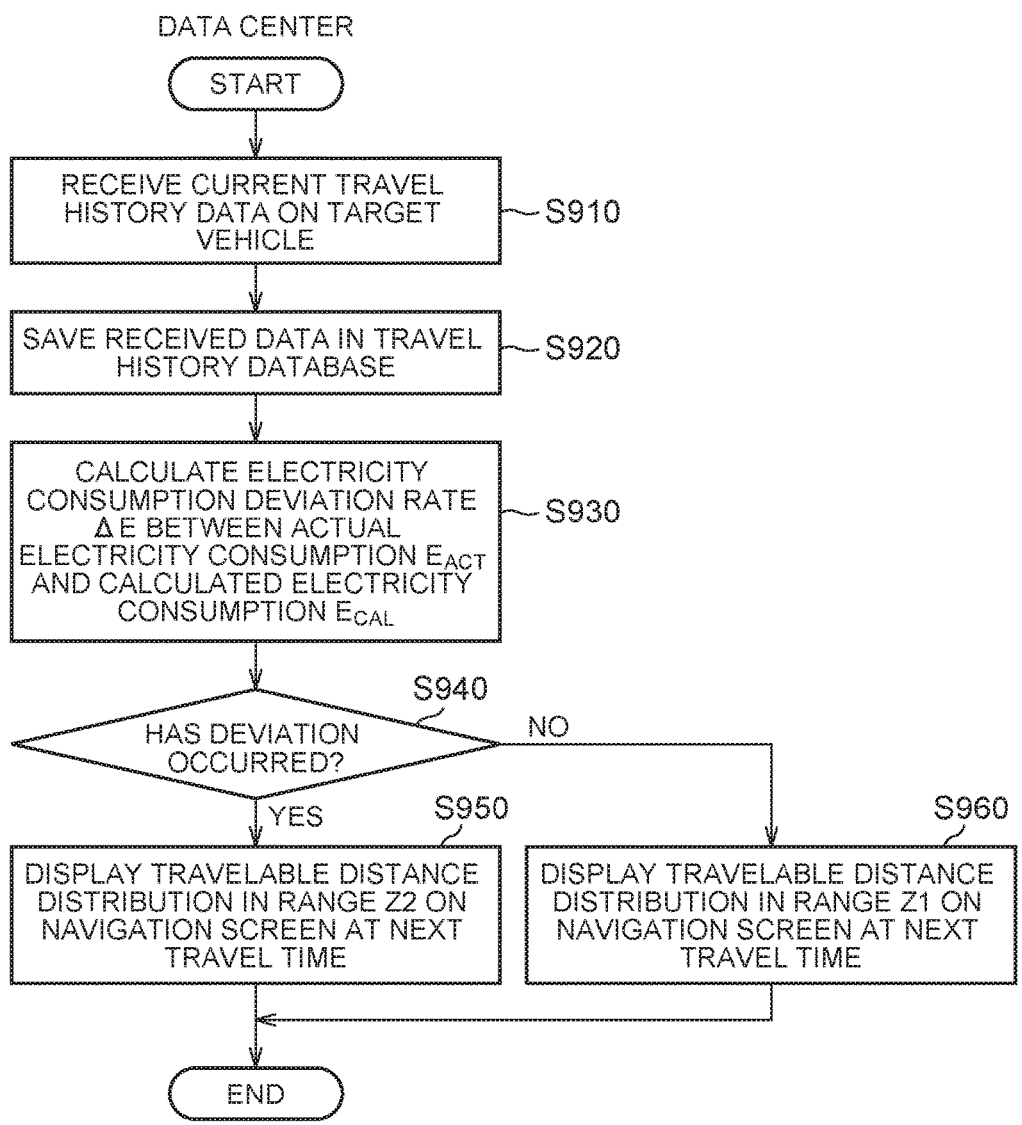
FIG. 13 is a flowchart showing the adjustment according to the driving tendency of a user.

FIG. 13 is a flowchart showing the adjustment according to the driving tendency of the user. The processing shown in this flowchart is executed when a predetermined condition is satisfied, for example, after the vehicle 1 has reached the destination or when the electric storage device 230 of the vehicle 1 is being charged from a power supply (not shown) outside the vehicle 1.

In step S910, the server 300 receives the travel history data on the vehicle 1 (data indicating the past result of the electricity consumption in all the links of the travel route in which the vehicle 1 actually traveled) via the communication device 350. This data may be sent and received at once when the above-mentioned predetermined condition is satisfied or may be sent and received serially during the traveling of the vehicle 1.

In step S920, the server 300 stores the current travel history data on the vehicle 1, received in step S910, in the travel history database 340. The server 300 collects and accumulates the travel history data on the vehicle 1 in this way every time the vehicle 1 travels so that the collected data is reflected on the next and subsequent data D1. The server 300 may use all of the collected data, or may use only a predetermined number of pieces of data, for example, based on the moving average.

In S930, for each link of the travel route of the vehicle 1, the server 300 calculates the error (electricity consumption deviation rate) ΔE between the actual electricity consumption $E_{ACT}$ of the vehicle 1 and the electricity consumption $E_{CAL}$ calculated in S850 according to the user setting (see FIG. 7). Furthermore, based on the electricity consumption deviation rate ΔE, the server 300 determines whether a deviation between the electricity consumption $E_{ACT}$ and the electricity consumption $E_{CAL}$ occurs (S940).

Figure 14:
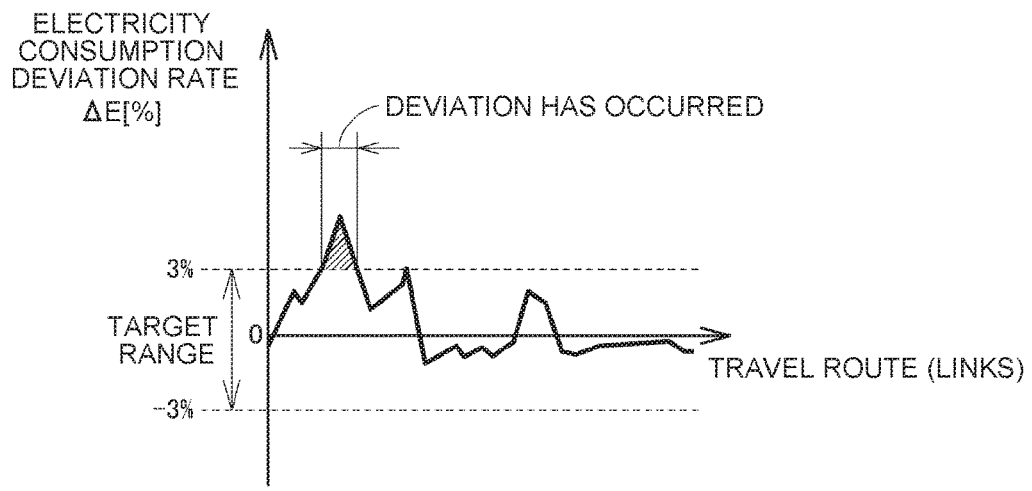
FIG. 14 is a diagram showing a method of determining the presence or absence of a deviation in the electricity consumption.

FIG. 14 is a diagram showing a method of determining the presence or absence of a deviation in the electricity consumption. In FIG. 14, the horizontal axis represents the travel route (a plurality of links) of the vehicle 1. The vertical axis represents the electricity consumption deviation rate ΔE in each link.

For example, the electricity consumption deviation rate ΔE can be calculated for each link, as shown by expression (2) given below, by dividing the difference ($E_{ACT}-E_{CAL}$) between the actual electricity consumption $E_{ACT}$ of the vehicle 1 and the electricity consumption $E_{CAL}$, calculated according to the user's operation, by the electricity consumption $E_{ACT}$.

$$\Delta E = (E_{ACT} - E_{CAL})/E_{ACT} \qquad (2)$$

For the electricity consumption deviation rate ΔE, the target range (for example, the range between the target value±3%) is predetermined by experiment or simulation. For a link where the electricity consumption deviation rate ΔE is outside the target range (see the hatched portion), the server 300 increments the count value that indicates that a deviation between electricity consumption $E_{ACT}$ and electricity consumption $E_{CAL}$ has occurred. When the count value (the number of links where a deviation in the electricity consumption has occurred) exceeds a predetermined number, or when the ratio of the count value to the total number of links exceeds a predetermined rate ("predetermined level"), it is determined that a deviation has occurred.

Returning to FIG. 13, if it is determined that a deviation between the electricity consumption $E_{ACT}$ and the electricity consumption $E_{CAL}$ has not occurred (NO in S940), the server 300 sets the flag F1. The flag F1, if set, causes the range Z1 of the median value±σ (σ is a standard deviation) of the travelable distance distribution to be displayed as shown in the top of FIG. 9 at the time the travelable distance distribution of other vehicles is displayed on the navigation screen 140 in S750 (see FIG. 7) when calculating the next travelable distance of the vehicle 1 (S960). As a result, when the vehicle 1 travels next time, the travelable distance distribution of other vehicles in the range corresponding to this flag F1 is displayed on the navigation screen 140.

On the other hand, if it is determined that a deviation between the electricity consumption $E_{ACT}$ and the electricity consumption $E_{CAL}$ has occurred (YES in S 940), the server 300 sets the flag F2 for widening the range of the travelable distance distribution of other vehicles displayed on the navigation screen 140 (S950). For example, the range of the travelable distance distribution displayed on the navigation screen 140 is expanded from Z1 to Z2. The range Z2 is, for example, a range of the median value±2σ. This completes the series of processing.

As described above, according to the first modification of the second embodiment, the travel history data (data D1) on the vehicle 1 is collected and accumulated each time the vehicle 1 travels. Thus, the calculation accuracy of the travelable distance of the vehicle 1 can be further improved according to the driving tendency of the user.

In addition, when having the user narrow down the data D2, the range of the travelable distance distribution of other vehicles displayed on the navigation screen 140 is adjusted depending on whether the user has a driving tendency that a deviation of the electricity consumption tends to occur. For a user for whom a deviation of the electricity consumption easily occurs, a wider range of travelable distance distribution is displayed than for a user for whom a deviation of the electricity consumption does not easily occur (that is, the display range of the travelable distance distribution displayed on the navigation screen 140 is widened). This gives the user a wider selection range, for example, when the user selects an arbitrary portion of the travelable distance distribution of other vehicles on the navigation screen 140, thus allowing the user to easily select the data D2 that matches the user's driving tendency.

It is sometimes conceivable that, as the target value (target travelable distance), the user considers the travelable distance of the vehicle 1 calculated using the data D2 narrowed down according to the traveling condition that has been set by the user himself/herself and that the user drives the vehicle 1 as if the driving was a game in order to achieve the target value. For example, it is conceivable that the user selects data with the longest possible traveling distance (theoretically best data corresponding to the most effective electricity consumption) as described above and that the user drives the vehicle 1 so that the travelable distance becomes as close as possible to the travelable distance of the selected data. In such a case, excessive air conditioning by the air conditioner 250 may result in a failure to achieve the target travelable distance. Therefore, in the second modification of the second embodiment, the control will be described for increasing the travelable distance of the vehicle 1 by reducing the electric power consumption amount of the air conditioner 250. Note that this control may be executed only when the user performs a specific operation.

Figure 15:
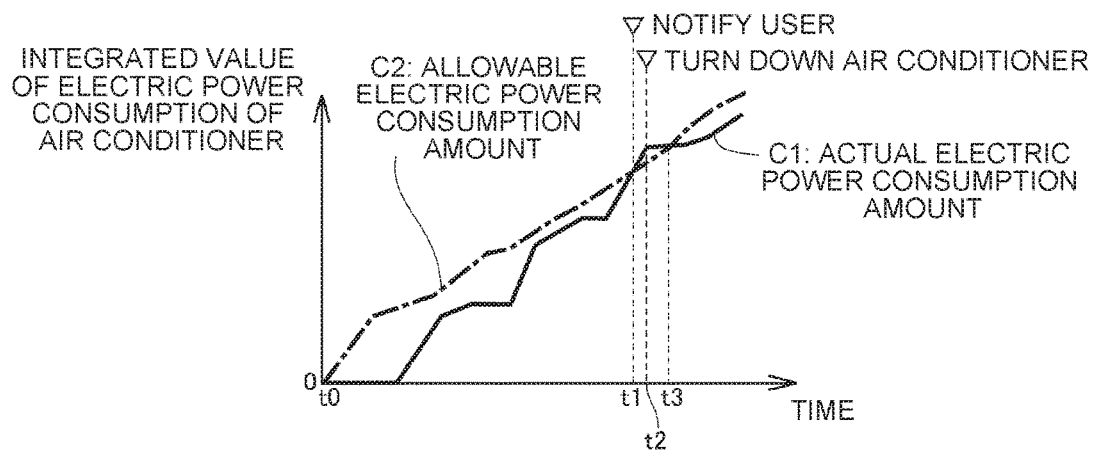
FIG. 15 is a timing diagram showing control for reducing the power consumption amount of an air conditioner.

FIG. 15 is a timing diagram showing the control for reducing the electric power consumption amount of the air conditioner 250. In FIG. 15, the horizontal axis represents the elapsed time with the calculated time of the travelable distance of the vehicle 1 as the initial time (t0). The vertical axis represents the integrated value (electric power consumption amount) obtained by sequentially integrating the electric power consumption of the air conditioner 250 from the initial time.

The broken line C1 indicates the integrated value of the actual electric power consumption of the air conditioner 250 in the current travel of the vehicle 1 (hereinafter also referred to as "actual electric power consumption amount"). On the other hand, the broken line C2 indicates the integrated value of the electric power consumption of the air conditioner 250 included in the data D2 narrowed down by a user operation (hereinafter also referred to as "allowable electric power consumption amount").

When the user wants to achieve the target travelable distance, it is desirable to display a graph, such as the one shown in FIG. 15, on the navigation screen 140 in real time in order to make the user conscious of the electric power consumption by the air conditioner 250. The integrated value of the electric power consumption by the air conditioner 250 may be displayed more simply, for example, by using a bar graph.

In the period to time t1, the actual electric power consumption amount is less than the allowable electric power consumption amount. When the actual electric power consumption amount reaches the allowable electric power consumption at time t1, the arithmetic unit 100 notifies the user that there is a possibility that the target travelable distance may not be achieved if the operation of the air conditioner 250 is continued at this pace. This notification may be output by displaying a message on the navigation screen 140 or by outputting voices from the speaker 150. Upon receiving the notification, the user saves the air consumption of the air conditioner 250, for example, by reducing the air volume of the air conditioner 250 (including by stopping the air conditioner 250) at time t2. Alternatively, the air volume of the air conditioner 250 may be automatically reduced (or may be automatically stopped) without requiring a user operation. As a result, the actual electric power consumption amount falls below the allowable electric power consumption again (see time t3).

In the second modification of the second embodiment, visualization of the electric power consumption amount of the air conditioner 250 makes it possible to support a user's challenge to achieve the target travelable distance, as described above. From another point of view, even if the initial target travelable distance cannot be achieved and the error between the target travelable distance and the actual travel distance is relatively large, this visualization informs the user that the error has been caused due to a large power consumption amount of the air conditioner 250. This information reduces user dissatisfaction that the calculation accuracy of the travelable distance is low.

If the user is unlikely to achieve the target travelable distance, a suggestion of accelerator work for improving the electricity consumption (message display on the navigation screen 140 or voice guidance) may also be provided to the user in addition to controlling the air conditioner 250. Also, if the SOC of the electric storage device 230 is likely to be exhausted before the vehicle 1 reaches the destination, a notification may be provided to the user to charge the electric storage device 23 earlier.

In addition, if the user cannot achieve the target travelable distance, the data D1 and the data D2, used by the user as the target, may be compared to analyze the cause and, then, the analysis result (for example, excessive air conditioning by the air conditioner 250, too frequent overtaking, etc.) may be fed back to the user.

The first embodiment and the second embodiment, including modifications thereof, may be combined as necessary to the extent that technical inconsistency does not occur. For example, there is no technical inconsistency in adding the narrowing down of the data D2, described in the second embodiment, to the first embodiment. In addition, there is no technical inconsistency in adding the control for extending the travelable distance, described in the second modification of the second embodiment, to the first modification of the first embodiment.

It should be noted that the embodiments disclosed above are exemplary and not restrictive in all respects. The scope of the present disclosure is indicated, not by the description of the embodiments described above, but by claims, and it is intended that the meanings equivalent to, and all changes within the scope of, claims be included.

What is claimed is:

1. A travelable distance calculation system for a vehicle, the travelable distance calculation system comprising:
a first storage device configured to store an energy consumption history of a target vehicle as first data, the energy consumption history including one of a fuel consumption history and an electricity consumption history;
a second storage device configured to store the energy consumption history of a plurality of vehicles other than the target vehicle as second data;
an arithmetic unit configured to calculate a travelable distance of the target vehicle by using at least one of the first data and the second data, and a usage ratio between the first data and the second data, the arithmetic unit configured to set the usage ratio between the first data and the second data according to an operation of a user of the target vehicle, when the arithmetic unit calculates the travelable distance of the target vehicle; and
a display device configured to display the travelable distance calculated by the arithmetic unit, wherein
the display device is configured to display an image that allows the user to select a traveling condition,
the second storage device is configured to store the second data for each traveling condition of the plurality of vehicles,
the arithmetic unit is configured to calculate the travelable distance of the target vehicle using second data corresponding to the traveling condition selected by the user,
the display device is configured to display at least one of a distribution of the second data corresponding to the traveling condition selected by the user and a distribution of travelable distances of the plurality of vehicles showing a number of vehicles corresponding to each travelable distance calculated by using the second data corresponding to the traveling condition selected by the user, and
the display device is configured to display the distribution such that a first range is larger than a second range, the first range being a range of the distribution displayed on the display when a deviation is equal to or larger than a predetermined level, the second range being a range of the distribution displayed on the display when the deviation is less than the predetermined level, and the deviation being a deviation between actual energy consumption history of the target vehicle and an energy consumption history calculated according to a setting by the user.

2. The travelable distance calculation system according to claim 1, wherein
the plurality of vehicles include a vehicle of the same type as a type of the target vehicle, and
the arithmetic unit is configured to set the usage ratio using data on the vehicle of the same type, the data on the vehicle of the same type being included in the second data.

3. The travelable distance calculation system according to claim 1, wherein when specific data is selected by the user from the at least one of distributions displayed on the display device, the display device is configured to display the traveling condition of the vehicle corresponding to the specific data.

4. The travelable distance calculation system according to claim 1, wherein the display device is configured to display a bar for allowing the user to adjust the usage ratio.

5. The travelable distance calculation system according to claim 1, wherein the second storage device is provided in a data center that is outside the target vehicle and outside the plurality of vehicles, the target vehicle includes the first storage device and sends the first data to the data center, and the data center includes a server configured to set the usage ratio.

6. The travelable distance calculation system according to claim 5, wherein the target vehicle is configured to send the first data to the data center periodically.

7. The travelable distance calculation system according to claim 5, wherein the target vehicle is configured to send the first data to the data center when a predetermined condition is satisfied.

8. A travelable distance calculation method for a vehicle, the vehicle including an arithmetic unit, the travelable distance calculation method comprising
  (i) calculating, by the arithmetic unit, a travelable distance of a target vehicle using at least one of first data and second data, and a usage ratio between the first data and the second data, the first data including an energy consumption history of a target vehicle, the energy consumption history including one of a fuel consumption history and an electricity consumption history, the second data including the energy consumption history of a plurality of vehicles other than the target vehicle,
  (ii) setting, by the arithmetic unit, the usage ratio between the first data and the second data according to an operation of a user of the target vehicle when the arithmetic unit calculates the travelable distance of the target vehicle, and
  (iii) displaying, via a display device, the travelable distance calculated by the arithmetic unit, wherein the display device is configured to display an image that allows the user to select a traveling condition, the second storage device is configured to store the second data for each traveling condition of the plurality of vehicles, the arithmetic unit is configured to calculate the travelable distance of the target vehicle using second data corresponding to the traveling condition selected by the user, the display device is configured to display at least one of a distribution of the second data corresponding to the traveling condition selected by the user and a distribution of travelable distances of the plurality of vehicles showing a number of vehicles corresponding to each travelable distance calculated by using the second data corresponding to the traveling condition selected by the user, and the display device is configured to display the distribution such that a first range is larger than a second range, the first range being a range of the distribution displayed on the display when a deviation is equal to or larger than a predetermined level, the second range being a range of the distribution displayed on the display when the deviation is less than the predetermined level, and the deviation being a deviation between actual energy consumption history of the target vehicle and an energy consumption history calculated according to a setting by the user.

* * * * *